US012753324B2

(12) United States Patent
Liu et al.

(10) Patent No.: US 12,753,324 B2
(45) Date of Patent: Oct. 6, 2026

(54) NON-AQUEOUS CROSS-LINKABLE COMPOSITION

(71) Applicant: ALLNEX RESINS (CHINA) CO., LTD., Suzhou (CN)

(72) Inventors: Jun Liu, Jiangsu (CN); Haibo Xu, Jiangsu (CN); Elwin De Wolf, Hoogerheide (NL); Shunan Dai, Jiangsu (CN); Yuzhu Fu, Jiangsu (CN)

(73) Assignee: ALLNEX RESINS (CHINA) CO., LTD., Jiangsu (CN)

( * ) Notice: Subject to any disclaimer, the term of this patent is extended or adjusted under 35 U.S.C. 154(b) by 145 days.

(21) Appl. No.: 17/920,898

(22) PCT Filed: May 7, 2021

(86) PCT No.: PCT/CN2021/092164

§ 371 (c)(1),
(2) Date: Oct. 24, 2022

(87) PCT Pub. No.: WO2021/227952

PCT Pub. Date: Nov. 18, 2021

(65) Prior Publication Data

US 2023/0183521 A1 Jun. 15, 2023

(30) Foreign Application Priority Data

May 10, 2020 (WO) ................ PCT/CN2020/089504

(51) Int. Cl.

| | |
|---|---|
| ***C09D 7/65*** | (2018.01) |
| ***C08F 220/28*** | (2006.01) |
| ***C08G 18/16*** | (2006.01) |
| ***C08G 18/40*** | (2006.01) |
| ***C08G 18/42*** | (2006.01) |
| ***C08G 18/62*** | (2006.01) |
| ***C08G 18/73*** | (2006.01) |
| ***C09D 175/06*** | (2006.01) |

(52) U.S. Cl.
CPC ........ *C09D 175/06* (2013.01); *C08F 220/281* (2020.02); *C08G 18/168* (2013.01); *C08G 18/4063* (2013.01); *C08G 18/42* (2013.01); *C08G 18/6254* (2013.01); *C08G 18/73* (2013.01); *C09D 7/65* (2018.01); *C08F 2800/20* (2013.01)

(58) Field of Classification Search
CPC ...... C09D 5/00; C09D 175/04; C09D 175/06; C08F 220/281; C08F 2800/20; C08F 220/20; C08F 212/08; C08G 18/168; C08G 18/4063; C08G 18/42; C08G 18/6254; C08G 18/73; C08G 18/246; C08G 18/2865; C08G 18/6229; C08G 18/792
See application file for complete search history.

(56) References Cited

U.S. PATENT DOCUMENTS

| | | | | |
|---|---|---|---|---|
| 4,605,719 A * | 8/1986 | Peelen | C09D 4/00 524/553 |
| 5,102,961 A | 4/1992 | Blank | |
| 5,214,086 A | 5/1993 | Mormile et al. | |
| 11,059,923 B2 | 7/2021 | Shi et al. | |
| 2004/0214942 A1* | 10/2004 | Huybrechts | C08G 18/6229 524/507 |
| 2008/0234410 A1 | 9/2008 | Van Engelen et al. | |
| 2012/0142848 A1 | 6/2012 | Bzowej et al. | |
| 2019/0106527 A1 | 4/2019 | Haldankar et al. | |
| 2019/0389990 A1 | 12/2019 | Shi et al. | |

FOREIGN PATENT DOCUMENTS

| | | | |
|---|---|---|---|
| CN | 106752879 | 5/2017 | |
| EP | 0 171 847 | 6/1988 | |
| EP | 1 454 934 | 9/2004 | |
| EP | 1454934 A1 * | 9/2004 | C08G 18/6233 |

OTHER PUBLICATIONS

International Search Report (ISR) issued Aug. 4, 2021 in International (PCT) Application No. PCT/CN2021/092164.

* cited by examiner

*Primary Examiner* — Hai Y Zhang
(74) *Attorney, Agent, or Firm* — Wenderoth, Lind & Ponack, L.L.P.

(57) ABSTRACT

The present invention relates to a polyol component (A) comprising at least one polyacrylate polyol (A1), crosslinkable composition comprising the polyol component (A), and its use in coatings. More particularly, the polyol component (A) comprises at least one polyacrylate polyol (A1) obtained from monomers of hydroxyalkyl(meth)acrylate monomers (a1) and (substituted) cycloaliphatic (meth)acrylate monomers (a4), the polyacrylate polyol (A1) having a Mn of between 500 and 2,000 Dalton and a Mw of between 800 and 4,000 Dalton. The crosslinkable composition comprises the polyol component (A) and a crosslinker (C) comprising functional groups reactable with polyacrylate polyol (A1). The crosslinkable composition is especially suitable for clear coat and top coat applications.

22 Claims, 1 Drawing Sheet

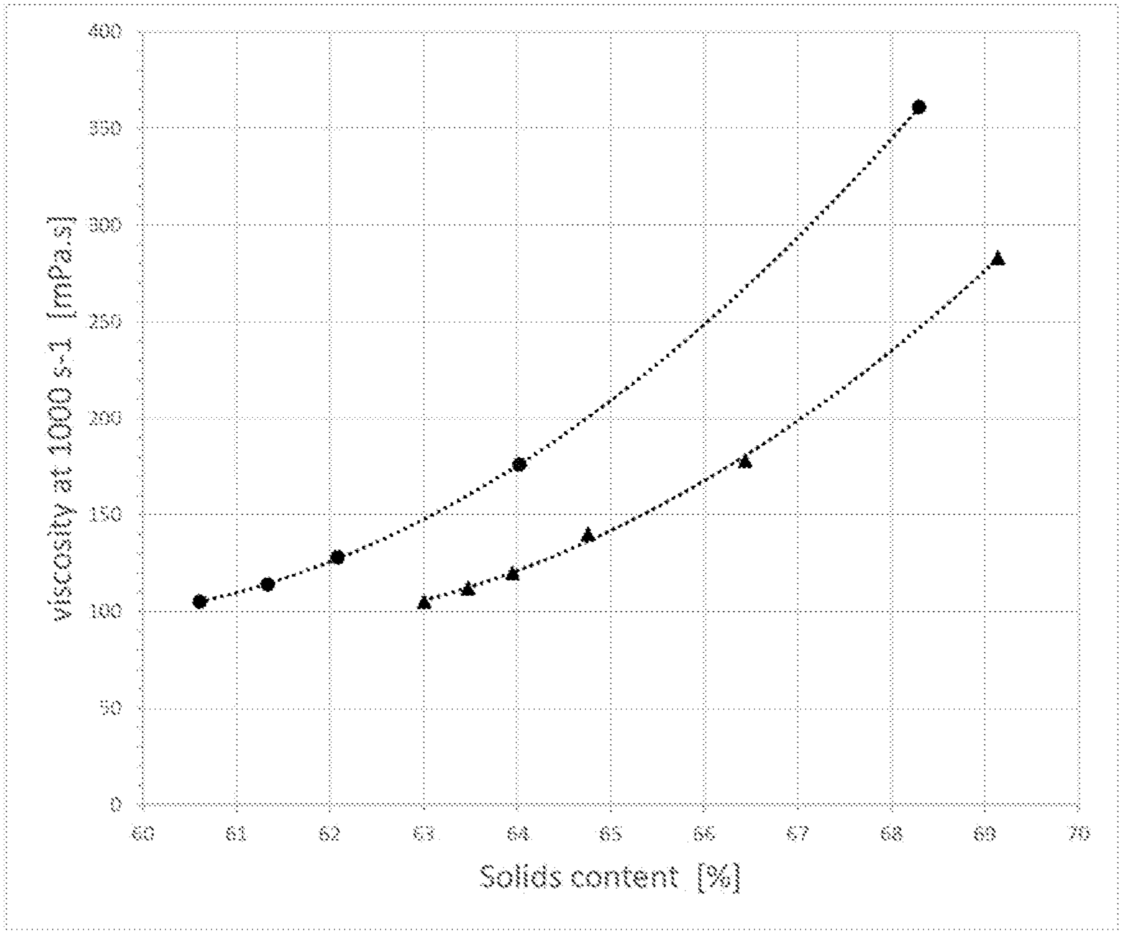
viscosity at 1000 s-1 [mPa.s]
400
350
300
250
200
150
100
50
0
60
61
62
63
64
65
66
67
68
69
70
Solids content [%]

NON-AQUEOUS CROSS-LINKABLE COMPOSITION

TECHNICAL FIELD

The present invention relates to a polyol component comprising a polyacrylate polyol, a crosslinkable composition comprising the polyol component, and its use in coatings.

BACKGROUND ART

In the current coatings market, regulatory demands to the amount of Volatile Organic Components (VOC) are becoming more and more stringent, especially in for example General Industry, Marine and Protective Coatings and Automotive applications. Legislation in especially the Chinese Automotive market nowadays requires paints, especially clear coat paints with measured VOC levels of lower than 460 g/L, especially for Automotive OEM, even more preferably lower than 420 g/L, most preferably lower than 400 g/L. This is particularly challenging for 1 component paints comprising an amino resin as crosslinker component. Therefore, the solids content of modern paints needs to be increased. It is known that increasing the solids content, thereby formulating a high solids paint composition, can be achieved by reducing the molecular weight of the binder present in the paint formulation (or coating composition). However, a lower molecular weight will result in a lower binder glass transition temperature Tg. Consequently, lowering the molecular weight of the binder in the paint formulation will severely affect the performance of the resulting paint or coating (Epple, U. and Vogel, K-H., European Coatings Journal, 07-08 (2005), page 49), for example resulting in lower hardness thereof, and making coatings less resistant to important chemicals.

Often, in HS crosslinkable compositions described in the art comprising a polyol and an amino resin or polyisocyanate hardener, polyacrylate polyols are used comprising esters of acrylic acid and an alcohol with a bulky cycloaliphatic moiety (for example isobornyl methacrylate (IBOMA)) as monomer.

In the context of the present description, High Solids (HS) crosslinkable coating compositions refer to compositions having a Volatile Organic Compound (VOC) content of lower than 460 g/L, preferably to unpigmented crosslinkable coating compositions having a VOC of lower than 460 g/L, preferably lower than 420 g/L, more preferably lower than 400 g/L.

Resins comprising isobornyl (meth)acrylate monomers are for example described in EP0676423. This document demonstrates the trend that the solids content of a paint formulation containing such resins with IBOMA-monomer increases with decreasing number averaged molecular weight of the polyol (or film-forming polymer). Unfortunately, this is accompanied with a decreasing hardness of the resulting paint as well.

Further examples of resins comprising isobornyl methacrylate, and their use in paint formulations further comprising melamine-formaldehyde resins, were described in U.S. Pat. No. 4,605,719. However, also these paint formulations yielded just a solids content of maximum 54.5% in clearcoat formulations. In pigmented formulations, it was possible to increase the solids content (including pigments) to 63.5%, but this was accompanied with a low Persoz hardness of just 235 of the resulting coating.

Moreover, as IBOMA is usually obtained from natural resources, the quality and purity of IBOMA are, with today's production and purification processes, not always reproducible enough to guarantee high quality polyacrylate resins. This may result in for example deviating color or smell of the polyacrylate resin and makes the use of such a bulky monomer in polyacrylate polyols economically less attractive for certain applications where high quality polyacrylate resins are needed. Furthermore, as IBOMA is a biobased material, its availability is decreasing in time.

Several alternative monomers for IBOMA are known in the art, for example as described in CN106752879. However, from the teaching of this document the skilled person yields resins with a number averaged molecular weight Mn of more than 10,000 Dalton, which makes these resins highly unsuitable for high solids paint systems.

Therefore, a need still exists for a (ultra) high solids (unpigmented) crosslinkable coating composition with measured VOC being lower than 460 g/L, even more preferably lower than 420 g/L, most preferably lower than 400 g/L, said composition providing good hardness, good or preferably improved appearance, excellent sag resistance and excellent chemical resistance of the resulting coatings.

SUMMARY OF INVENTION

According to an aspect of the present invention, there is therefore provided a polyol component (A) comprising at least one polyacrylate polyol (A1), as set out in the appended claims.

According to another aspect of the invention, there is provided a crosslinkable composition comprising the polyol component (A), as set out in the appended claims.

According to other aspects of the invention, a binder module comprising at least one polyacrylate polyol (A1) and a method of providing a coating are provided as well, as set out in the appended claims.

Advantageous aspects of the present invention are set out in the (dependent) claims and are further discussed in the description below.

BRIEF DESCRIPTION OF THE FIGURES

Aspects of the Invention will now be described in more detail. In the Examples, reference is made to the appended FIGURE, i.e. FIG. 1 displaying the viscosity of paints from Example 5 (triangle) and Comparative Example 6 (circle) versus calculated solids content.

DESCRIPTION OF EMBODIMENTS

Applicants have found crosslinkable compositions that overcome the drawbacks encountered with the compositions described in the art up to now and that provide the combination of properties as here above described. According to an aspect of the present invention, there is therefore provided a polyol component (A) comprising at least one polyacrylate polyol (or (meth)acrylic polyol) (A1) obtained from:

- 10 to 60 wt % of hydroxyalkyl(meth)acrylate monomers (a1), preferably from 10 to 55 wt %, more preferably from 15 to 50 wt %, most preferably from 20 to 40 wt %, wherein the hydroxylated alkyl group contains from 1 to 20 carbon atoms, preferably from 1 to 12 carbon atoms;
- optionally from 0 to 70 wt % of linear or branched alkyl(meth)acrylate monomers (a2), preferably from 10 to 60 wt %, more preferably from 15 to 50 wt %, most preferably from 15 to 40 wt %, wherein the alkyl group contains from 1 to 20 carbon atoms, preferably from 1 to 12 carbon atoms;

optionally from 0 to 60 wt %, preferably from 5 to 60 wt %, more preferably from 10 to 50 wt %, even more preferably from 10 to 40 wt %, of vinyl monomers (a3), preferably (substituted) styrene;

5 to 50 wt % of (substituted) cycloaliphatic (meth)acrylate monomers (a4), preferably from 10 to 45 wt %, more preferably from 10 to 40 wt %, most preferably from 15 to 35 wt %; preferably the cycloaliphatic group of the (substituted) cycloaliphatic (meth)acrylate (a4) contains from 5 to 16 carbon atoms, more preferably from 6 to 12 carbon atoms, more preferably the cycloaliphatic group of the (substituted) cycloaliphatic (meth) acrylate (a4) comprises a (substituted) cycloalkyl moiety, a (substituted) bicyclo[x.y.z]alkyl moiety or a (substituted) tricyclo[x.y.z1.z2]alkyl moiety (the sum of x+y+z+2, or x+y+z1+z2+2 being equal to the total number of carbon atoms in the cycloaliphatic moiety); and optionally from 0 to 5 wt % (meth)acrylic acid (a5), preferably from 0 to 3 wt % (meth)acrylic acid, more preferably from 0 to 1 wt % (meth)acrylic acid, even more preferably from 0 to 0.5 wt % (meth)acrylic acid, most preferably the polyacrylate polyol (A1) is substantially free from (meth)acrylic acid;

based on the sum of (a1), (a4), and, if present, (a2), (a3) and (a5);

the polyacrylate polyol (A1) having:

a number averaged molecular weight Mn of between 500 and 2,000 Dalton, preferably between 550 and 1,600 Dalton, more preferably between 600 and 1,400 Dalton, most preferably between 700 and 1.300 Dalton;

a weight averaged molecular weight Mw of between 800 and 4,000 Dalton, preferably between 900 and 3.500 Dalton, more preferably between 1,000 and 2,900 Dalton, even more preferably between 1,000 and 2,500 Dalton, even more preferably between 1,000 and 2,200 Dalton, and most preferably between 1,000 and 2.000 Dalton.

In the context of the present description, (substituted) cycloaliphatic (meth)acrylate monomers refer to (substituted) cycloalkyl(meth)acrylate monomers, or to (substituted) bicyclo[x.y.z]alkyl(meth)acrylate monomers or (substituted) tricyclo[x.y.z1.z2]alkyl(meth)acrylate monomers, the sum of x+y+zn+2 (i.e. x+y+z+2, or x+y+z1+z2+2) being equal to the total number of carbon atoms in the cycloaliphatic moiety. The (substituted) cycloaliphatic (meth)acrylate monomers are bulky monomers.

In the context of the present description, "(substituted) cycloaliphatic (meth)acrylate monomers" encompass both substituted and unsubstituted cycloaliphatic (meth)acrylate monomers. Substituted cycloaliphatic (meth)acrylate monomers refer to cycloaliphatic (meth)acrylate monomers having one or more substituents at their cycloaliphatic ring (the substituent being different from a hydrogen atom), unsubstituted cycloaliphatic (meth)acrylate monomers refer to cycloaliphatic (meth)acrylate monomers having no such substituents at their cycloaliphatic ring.

In the context of the present description, crosslinkable coating composition is also referred to as crosslinkable composition or coating composition or composition.

The prefix "(meth)acryl" when used to name compounds in the present description encompasses both "acryl" and "methacryl" and refers to compounds comprising at least one $CH_2CHCOO$— group or $CH_2{=}CCH_3COO$— group, as well as mixtures thereof and mixtures of such compounds.

According to another aspect of the present invention, there is provided a crosslinkable composition comprising:

a) a polyol component (A) according to the invention (as described here above);

b) optionally at least one polyol (B) being different from polyacrylate polyol (A1) and comprising at least two free hydroxyl groups;

c) at least one crosslinker (C) comprising functional groups reactable with polyacrylate polyol (A1), polyol (B) if present, and/or reactive diluent (F) if present; and d) optionally at least one catalyst (D) for catalyzing the reaction between hydroxyl groups of polyacrylate polyol (A1), if present polyol (B), if present reactive diluent (F), and functional groups of crosslinker (C), the catalyst (D) being present in an amount of between 0 and 10 wt %, preferably between 0 and 3 wt %, of the total amount of polyacrylate polyol (A1), if present polyol (B), crosslinker (C), if present catalyst (D), and, if present pot life extender (E), reactive diluent (F) and/or anti-sagging agent (G);

e) optionally at least one pot life extender (E);

f) optionally at least one reactive diluent (F) having a number averaged molecular weight ranging from 62 to 4,000 Dalton, preferably ranging from 62 to 2,000 Dalton, more preferably from 62 to 1,000 Dalton, a polydispersity Mw/Mn ranging from 1 to 3, preferably from 1 to 1.5, more preferably from 1 to 1.3, even more preferably from 1 to 1.25, and an average hydroxyl functionality ranging from 1 to 6, preferably from 1.5 to 4, more preferably from 1.8 to 3.5;

g) optionally at least one anti-sagging agent (G).

In the context of the present description, the wording "polyol (B) being different from polyacrylate polyol (A1)" refers to polyol (B) having a different monomer composition and/or different Mn and/or different Mw and/or different glass transition temperature Tg compared to polyacrylate polyol (A1).

Applicants have found that the use of such polyol component (A) and crosslinkable composition allows to obtain a coating having good hardness, good or preferably improved appearance, excellent sag resistance and excellent chemical resistance combined with low VOC (obtained by low viscosity of less than 400 mPa·s at 70% solid content of the at least one polyacrylate polyol (A1) comprised in the polyol component (A)). More specifically, the (unpigmented) composition is highly suitable to be formulated at a very low content of volatile organic compounds (i.e. a VOC content being lower than 460 g/L, even more preferably lower than 420 g/L, most preferably lower than 400 g/L) and without highly toxic material.

Furthermore, the resulting crosslinked material provides good resistance to sunlight, is durable and has good mechanical properties. It is particularly surprising that use of polyacrylate polyol (A1) of the invention provides a better balance between VOC and hardness compared to crosslinkable compositions described in the art. More particularly, the inclusion of (substituted) cycloaliphatic (meth)acrylate monomers (a4) in the polyacrylate polyol (A1), together with its low weight averaged molecular weight Mw and high Tg, results in low VOC, high solids formulations, thereby avoiding the need for further dilution with solvents for spraying and hence avoiding increasing the VOC content of the composition. Moreover, with such formulations, coatings with good chemical resistance are obtained.

The present composition is also particularly useful in formulating low VOC, high solids solvent borne clear coat and topcoat compositions for, for example, vehicle refinishes, for Automotive OEM, for transportation vehicles, for general industry applications as well as in flooring applications.

The crosslinkable composition according to the invention is preferably a so-called non-aqueous composition, referring to a composition comprising less than 10% of water, preferably less than 5% of water, more preferably less than 1% of water, or being even substantially free of water (i.e. not containing water).

The polyol component (A) according to the Invention preferably comprises less than 10% of water, more preferably less than 5% of water, most preferably less than 1% of water, or is even substantially free of water (i.e. not containing water).

In the context of the present description, polyacrylate polyol (A1) refers to (meth)acrylic polyol (A1).

The polyacrylate polyol (A1) used in the polyol component (A) and composition according to the invention is preferably a (co)polymer, more preferably a random (co) polymer, comprising on average at least 2 free hydroxyl (—OH) groups.

The polyacrylate polyol (A1) (or (meth)acrylic polyol (A1)) is obtained, preferably in the presence of a free radical initiator, by the (co)polymerization of the following monomers and their amounts (or polyacrylate polyol (A1) comprises residues formed from the (co-)polymerization of the following monomers and their amounts):

10 to 60 wt % of hydroxyalkyl(meth)acrylate monomers (a1), preferably from 10 to 55 wt %, more preferably from 15 to 50 wt %, most preferably from 20 to 40 wt %, wherein the hydroxylated alkyl group contains from 1 to 20 carbon atoms, preferably from 1 to 12 carbon atoms such as hydroxyethyl (meth)acrylate, hydroxypropyl (meth)acrylate, hydroxybutyl (meth)acrylate, adducts of hydroxyalkyl (meth)acrylates and caprolactone, or mixtures thereof;

optionally from 0 to 70 wt % of linear or branched alkyl(meth)acrylate monomers (a2), preferably from 10 to 60 wt %, more preferably from 15 to 50 wt %, most preferably from 15 to 40 wt %, wherein the alkyl group contains from 1 to 20 carbon atoms, preferably from 1 to 12 carbon atoms such as methyl (meth)acrylate, n-butyl (meth)acrylate, n-hexyl (meth)acrylate, n-octyl (meth)acrylate, lauryl (meth)acrylate, isopropyl (meth) acrylate, isobutyl (meth)acrylate, 2-ethylhexyl (meth) acrylate, isooctyl (meth)acrylate, esters of (meth) acrylic acid and alcohols (available, for example, under the trade name ISOFOL®), or mixtures thereof;

optionally from 0 to 60 wt %, preferably from 5 to 60 wt %, more preferably from 10 to 50 wt %, even more preferably from 10 to 40 wt %, of vinyl monomers (a3), such as styrene or vinyl toluene, preferably styrene;

5 to 50 wt % of (substituted) cycloaliphatic (meth)acrylate monomers (a4), preferably from 10 to 45 wt %, more preferably from 10 to 40 wt %, most preferably from 15 to 35 wt %; preferably the cycloaliphatic group of the (substituted) cycloaliphatic (meth)acrylate (a4) contains from 5 to 16 carbon atoms, more preferably from 6 to 12 carbon atoms, more preferably the cycloaliphatic group of the (substituted) cycloaliphatic (meth) acrylate (a4) comprises a (substituted) cycloalky moiety, a (substituted) bicyclo[x.y.z]alkyl moiety or a (substituted) tricyclo[x.y.z1.z2]alkyl moiety (the sum of x+y+z+2, or x+y+z1+z2+2 being equal to the total number of carbon atoms in the cycloaliphatic moiety); and optionally from 0 to 5 wt % (meth)acrylic acid (a5), preferably from 0 to 3 wt % (meth)acrylic acid, more preferably from 0 to 1 wt % (meth)acrylic acid, even more preferably from 0 to 0.5 wt % (meth)acrylic acid, most preferably the polyacrylate polyol (A1) is substantially free from (meth)acrylic acid;

based on the sum of (a1), (a4), and, if present, (a2), (a3) and (a5).

Preferably, the (meth)acrylic polyol (A1) is obtained by the (co)polymerization of the following monomers and their amounts:

10 to 60 wt % of hydroxyalkylacrylate monomers (a1') or hydroxyalkylmethacrylate monomers (a1"), preferably from 10 to 55 wt %, more preferably from 15 to 50 wt %, most preferably from 20 to 40 wt %, wherein the hydroxylated alkyl group contains from 1 to 20 carbon atoms, preferably from 1 to 12 carbon atoms such as hydroxyethyl (meth)acrylate, hydroxypropyl (meth) acrylate, hydroxybutyl (meth)acrylate, adducts of hydroxyalkyl (meth)acrylates and caprolactone, or mixtures thereof;

optionally from 0 to 70 wt % of linear or branched alkylacrylate monomers (a2') or linear or branched alkylmethacrylate monomers (a2"), preferably from 10 to 60 wt %, more preferably from 15 to 50 wt %, most preferably from 15 to 40 wt % or even less than 20 wt %, wherein the alkyl group contains from 1 to 20 carbon atoms, preferably from 1 to 12 carbon atoms such as methyl (meth)acrylate, n-butyl (meth)acrylate, n-hexyl (meth)acrylate, n-octyl (meth)acrylate, lauryl (meth)acrylate, isopropyl (meth)acrylate, isobutyl (meth)acrylate, 2-ethylhexyl (meth)acrylate, isooctyl (meth)acrylate, esters of (meth)acrylic acid and alcohols (available, for example, under the trade name ISOFOL®), or mixtures thereof;

optionally from 0 to 60 wt %, preferably from 5 to 60 wt %, more preferably from 10 to 50 wt %, even more preferably from 10 to 40 wt %, of vinyl monomers (a3), such as styrene or vinyl toluene, preferably styrene;

5 to 50 wt % of (substituted) cycloaliphatic acrylate monomers (a4') or (substituted) cycloaliphatic methacrylate monomers (a4"), preferably from 10 to 45 wt %, more preferably from 10 to 40 wt %, most preferably from 15 to 35 wt %; preferably the cycloaliphatic group of the (substituted) cycloaliphatic acrylate (a4') or the (substituted) cycloaliphatic methacrylate (a4") contains from 5 to 16 carbon atoms, more preferably from 6 to 12 carbon atoms; more preferably the cycloaliphatic group of the (substituted) cycloaliphatic acrylate (a4') or the (substituted) cycloaliphatic methacrylate (a4") comprises a (substituted) cycloalkyl moiety, a (substituted) bicyclo[x.y.z]alkyl moiety or a (substituted) tricyclo[x.y.z1.z2]alkyl moiety (the sum of x+y+z+2, or x+y+z1+z2+2 being equal to the total number of carbon atoms in the cycloaliphatic moiety), said alkyl moieties containing from 5 to 16 carbon atoms, preferably from 6 to 12 carbon atoms, more preferably from 6 to 9 carbon atoms or, alternatively and most preferably said alkyl moieties containing 10 carbon atoms; and optionally from 0 to 5 wt % (meth)acrylic acid (a5), preferably from 0 to 3 wt % (meth)acrylic acid, more preferably from 0 to 1 wt % (meth)acrylic acid, even more preferably from 0 to 0.5 wt % (meth)acrylic acid, most preferably the polyacrylate polyol (A1) is substantially free from (meth)acrylic acid;

based on the sum of (a1'), (a1"), (a4'), (a4") and, if present, (a2'), (a2"), (a3) and (a5). Preferably, in the monomers used, the ratio (acrylate monomers (a1')+(a2')+(a4'))/(methacrylate monomers (a1")+(a2")+(a4")) is from 0 to 1, more preferably from 0.1 to 1, even more preferably from 0.2 to 0.95.

In the context of the present description, a random (co) polymer refers to a (co)polymer in which the monomer residues are located randomly in the (co)polymer molecule. Suitable methods for producing random (co)polymers will be apparent for those skilled in the art.

Preferably, when polyacrylate polyol (A1) is a random (co)polymer, the method for producing random (co)polymer (A1) does not control the end group moieties of the random (co)polymer (A1). More preferably, when polyacrylate polyol (A1) is a random (co)polymer, the random (co) polymer (A1) has a random distribution of the OH functionalities over its polymer chains (further to the monomer residues being located randomly in the (co)polymer molecule, vide supra), the random (co)polymer (A1) does not comprise monomers comprising a C═C unsaturated bond other than (a1) to (a5) (more particularly the random (co) polymer (A1) comprises 0 wt % of polybutadiene), and/or the random (co)polymer (A1) does not comprise (residues of) epoxy functionalities in the side chains (more particularly the random (co)polymer (A1) comprises 0 wt % of (residues of) epoxy functionalities in the side chains), such as residues of reaction products of glycidyl (meth)acrylate with long chain (linear or branched) carboxylic acids.

Non-limiting examples of (substituted) cycloaliphatic (meth)acrylate monomers (a4) containing a cycloaliphatic group with from 5 to 16 carbon atoms for use in the present invention are (substituted) cyclopentyl (meth)acrylate, (substituted) cyclohexyl (meth)acrylate, (substituted) cycloheptyl (meth)acrylate, isomers of limonene (meth)acrylate, isomers of carvone (meth)acrylate, isomers of pinene (meth) acrylate, isosorbide (meth)acrylate, 3,3,5-trimethylcyclohexyl (meth)acrylate, esters of (meth)acrylic acid and hydroxylated (substituted) decalin, esters of (meth) acrylic acid and hydroxylated (substituted) bicycloalkyl, isomers of dimethylbicyclo[2.2.1]heptyl (meth)acrylate, isomers of ethylbicyclo[2.2.1]heptyl (meth)acrylate, isomers of ethyldimethylbicyclo[2.2.1]heptyl (meth)acrylate, isomers of diethylmethylbicyclo[2.2.1]heptyl (meth)acrylate, isomers of trimethylbicyclo[2.2.1]heptyl (meth)acrylate, isomers of trimethylbicyclo[3.1.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, isobornyl (meth)acrylate, (substituted) norbornyl (meth)acrylate, isomers of bicyclo [2.2.1]hept-5-en-2-ylmethyl (meth)acrylate. (substituted) adamantyl (meth)acrylate, (substituted) dicyclopentadiene (meth)acrylate, (substituted) bicyclo[2.2.2]octyl (meth) acrylate, (substituted) bicyclo[4.2.0]octyl (meth)acrylate, (substituted) polycyclopentadienyl (meth)acrylate, or mixtures thereof; preferably (substituted) cyclopentyl (meth) acrylate. (substituted) cyclohexyl (meth)acrylate, (substituted) cycloheptyl (meth)acrylate, 3,3,5-trimethylcyclohexyl (meth)acrylate, isobornyl (meth) acrylate, (substituted) norbornyl (meth)acrylate, isomers of bicyclo[22.1]hept-5-en-2-ylmethyl (meth)acrylate, (substituted) adamantyl (meth)acrylate, (substituted) dicyclopentadiene (meth)acrylate, (substituted) polycyclopentadienyl (meth)acrylate, or mixtures thereof. The (substituted) cycloaliphatic moiety in the monomer (a4) may further comprise functional groups, such as but not limited to hydroxy, tertiary amine, ether, ester, epoxy, mercaptane and/or carboxylic acid groups.

In one embodiment, the cycloaliphatic group of the (substituted) cycloaliphatic (meth)acrylate (a4) is a (substituted) cyclopentyl (meth)acrylate, (substituted) cyclohexyl (meth) acrylate or (substituted) cycloheptyl (meth)acrylate containing from 5 to 16 carbon atoms, preferably a (substituted) cyclopentyl (meth)acrylate or (substituted) cycloheptyl (meth)acrylate containing from 5 to 16 carbon atoms or a (substituted) cyclohexyl (meth)acrylate containing from 7 to 16, preferably from 9 to 15 carbon atoms, more preferably from 10 to 14 carbon atoms.

In a preferred embodiment, the cycloaliphatic group of the (substituted) cycloaliphatic (meth)acrylate (a4) is a (substituted) bicyclo[x.y.z]alkyl moiety containing from 6 to 9 carbon atoms.

In an alternative more preferred embodiment, the cycloaliphatic group of the (substituted) cycloaliphatic (meth) acrylate (a4) is a substituted bicyclo[x.y.z.]alkyl moiety containing 10 carbon atoms, preferably an a,b,c-trimethyl-bicyclo[x.y.z]heptyl moiety, where a, b and c denote the positions of the methyl groups on the bicyclo[x.y.z]heptyl ring, more preferably a,b,c-trimethylbicyclo[2.2.1]heptyl or a,b,c-trimethylbicyclo[3.1.1]heptyl moiety, even more preferably isomers of 2,6,6-trimethylbicyclo[3.1.1]heptyl, 1,3,3-trimethylbicyclo[2.2.1]heptyl or 1,7,7-trimethylbicyclo [2.2.1]heptyl moiety, most preferably isomers of 2,6,6-trimethylbicyclo[3.1.1]heptyl or 1,3,3-trimethylbicyclo [2.2.1]heptyl moiety, even most preferably isomers of 1,3,3-trimethylbicyclo[2.2.1]heptyl moiety.

In an alternative embodiment, the cycloaliphatic group of the (substituted) cycloaliphatic (meth)acrylate (a4) is a bicyclo[x.y.z]alkyl moiety containing from 11 to 16 carbon atoms.

In another alternative embodiment, the cycloaliphatic group of the (substituted) cycloaliphatic (meth)acrylate (a4) is a (substituted) tricyclo[x.y.z1.z2]alkyl moiety containing from 5 to 16 carbon atoms, preferably from 7 to 14 carbon atoms, more preferably from 9 to 13 carbon atoms, most preferably 11 or 12 carbon atoms. Preferably the (substituted) tricyclo[x.y.z1.z2]alkyl moiety comprises a (partially) hydrogenated (substituted) indene moiety and/or at least one (substituted) norbornyl moiety, more preferably a (partially) hydrogenated (substituted) Indene moiety and at least one (substituted) norbornyl moiety, most preferably a (octahydro-4,7-methano-1H-indenyl)methyl moiety. Examples of such (substituted) cycloaliphatic (meth)acrylate (a4) comprising a (substituted) tricyclo[x.y.z1.z2]alkyl moiety are (octahydro-4,7-methano-1H-indenyl)methyl (meth)acrylate, esters of isomers of octahydro-4,7-methano-1H-Indenedimethanol and (meth)acrylic acid, or mixtures thereof; preferably (octahydro-4,7-methano-1H-indenyl)methyl (meth) acrylate, monoesters of Isomers of octahydro-4,7-methano-1H-indenedimethanol and (meth)acrylic acid, or mixtures thereof.

Preferably, the (substituted) cycloaliphatic (meth)acrylate monomers (a4) used for obtaining the (meth)acrylic polyol (A1) used in the polyol component (A) and composition according to the invention are isobornyl (meth)acrylate, 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-Indenedimethanol and (meth)acrylic acid, norbornyl (meth)acrylate, (substituted) cyclohexyl (meth)acrylate, or mixtures thereof; more preferably the monomers (a4) are isobornyl (meth)acrylate, 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acrylate, or mixtures thereof; even more preferably the monomer (a4) is 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acrylate or mixtures thereof; most preferably the monomer (a4) is 1,3,3-trimethylbicyclo[2.2.1]heptyl (meth)acrylate, norbornyl (meth)acrylate, (octahydro-4,7-methano-1H-indenyl)methyl (meth)acrylate, monoesters of octahydro-4,7-methano-1H-indenedimethanol and (meth)acrylic acid, or mixtures thereof.

In a more preferred embodiment of the invention, the (substituted) cycloaliphatic (meth)acrylate monomer (a4) is 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acrylate or mixtures thereof, preferably 1,3,3-trimethylbicyclo[2.2.1]heptyl (meth)acrylate, norbornyl (meth)acrylate, (octahydro-4,7-methano-1H-indenyl)methyl (meth)acrylate, monoesters of octahydro-4,7-methano-1H-indenedimethanol and (meth) acrylic acid, or mixtures thereof, and the hydroxyalkyl (meth)acrylate monomers (a1) used for obtaining the (meth) acrylic polyol (A1) used in the polyol component (A) and composition according to the invention are hydroxyethyl (meth)acrylate, hydroxypropyl (meth)acrylate, hydroxybutyl(meth)acrylate, or mixtures thereof.

In an alternative embodiment of the invention, the (substituted) cycloaliphatic (meth)acrylate monomers (a4) are isobornyl (meth)acrylate, 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, (substituted) cyclohexyl (meth)acrylate, or mixtures thereof, preferably isobornyl (meth)acrylate, and the hydroxyalkyl(meth)acrylate monomers (a1) used for obtaining the (meth)acrylic polyol (A1) used in the polyol component (A) and composition according to the invention, are hydroxyethyl (meth) acrylate, hydroxypropyl (meth)acrylate, hydroxybutyl (meth)acrylate, or mixtures thereof, preferably hydroxyethyl (meth)acrylate, hydroxypropyl (meth)acrylate, or mixtures thereof.

In another alternative and more preferred embodiment of the invention, the (substituted) cycloaliphatic (meth)acrylate monomers (a4) are isobornyl (meth)acrylate, 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth) acrylic acid, (substituted) cyclohexyl (meth)acrylate, or mixtures thereof, preferably isobornyl (meth)acrylate, and the hydroxyalkyl(meth)acrylate monomers (a1) used for obtaining the (meth)acrylic polyol (A1) used in the polyol component (A) and composition according to the invention, comprise more than 50 wt %, preferably more than 60 wt %, more preferably more than 80 wt %, most preferably more than 90 wt % or even 100 wt % of hydroxyalkylmethacrylate monomers (a1") based on the total weight of hydroxyalkyl (meth)acrylate monomers (a1). Preferably, the hydroxyalkylmethacrylate monomers (a1") are hydroxyethylmethacrylate, hydroxypropylmethacrylate, hydroxybutylmethacrylate, or mixtures thereof, more preferably hydroxyethylmethacrylate, hydroxypropylmethacrylate, or mixtures thereof.

(Octahydro-4,7-methano-1H-indenyl)methyl (meth)acrylate is also referred to as 3-tricyclo[5.2.1.$0^{2,6}$]decanylmethyl (meth)acrylate.

Octahydro-4,7-methano-1H-indenedimethanol is also referred to as tricyclo[5.2.1.$0^{2,7}$]decanedimethanol.

The polymerizing step can include at least one polymerization initiator and/or chain transfer agent. Any initiator and/or chain transfer agent known to the skilled person can be used. The polymerization reaction can further be conducted in organic solution in the presence of known solvents. Examples of such solvents include toluene, xylene, n-butyl acetate, ethyl acetate, ethyl glycol acetate, isomeric pentyl acetates, hexyl acetates, methoxypropyl acetates, tetrahydrofuran, dioxane, acetone, methyl ethyl ketone and methyl isobutyl ketone. Also suitable are mixtures of higher-boiling aromatic compounds, such as Solvent Naphtha solvents, homologs of benzene, the Solvesso solvents, the Shellsol solvents; and also high-boiling, aliphatic and cycloaliphatic hydrocarbons, such as white spirit, mineral turpentine, the Isopar solvents, the Nappar solvents, tetralin and decalin. Mixtures of solvents may also be used. When the polymerization is conducted in a solvent, preferred solvents are n-butyl acetate, methoxypropyl acetate and xylene, as well as mixtures of these solvents.

The polyacrylate polyol (A1) used in the polyol component (A) and composition of the invention has a weight averaged molecular weight Mw of less than 4,000 Dalton, preferably less than 3,500 Dalton, more preferably less than 2,500 Dalton, even more preferably less than 2,200 Dalton, most preferably less than 2,000 Dalton.

The number averaged molecular weight Mn of the polyacrylate polyol (A1) is at most 2,000 Dalton, preferably at most 1.600 Dalton, more preferably at most 1,400 Dalton, most preferably at most 1,300 Dalton.

The polydispersity, defined as Mw/Mn. of the polyacrylate polyol (A1) used in the polyol component (A) and composition of the invention is preferably less than 4, more preferably less than 3, even more preferably less than 2.5, or most preferably less than 2.

The weight averaged molecular weight Mw and number averaged molecular weight Mn are determined according to ASTM D 3593 standard by Gel Permeation Chromatography using polystyrene standards, more particularly using size exclusion chromatography.

Preferably, the glass transition temperature Tg of the polyacrylate polyol (A1) used in the polyol component (A) and composition of the invention is higher than −25° C., preferably higher than −15° C., more preferably higher than 0° C. (i.e. a glass transition temperature of 0° C. or higher), most preferably higher than 5° C. The glass transition temperature Tg of the polyacrylate polyol (A1) is lower than 50° C., preferably lower than 35° C., more preferably lower than 30° C., most preferably lower than 25° C.

More preferably, the glass transition temperature Tg of the polyacrylate polyol (A1) used in the polyol component (A) and composition of the invention is comprised between 0° C. and 50° C., even more preferably between 0° C. and 35° C., most preferably between 5° C. and 30° C.

The Tg is measured using a Mettler DSC 3+ calorimeter according to DIN EN ISO 18805 and ISO 11357.

Preferably, the acid value (AV) of the polyacrylate polyol (A1) used in the polyol component (A) and composition of the invention is lower than 20 mg KOH per gram of polyol (A1), preferably lower than 15 mg KOH per gram of polyol (A1), more preferably lower than 10 mg KOH per gram of polyol (A1), most preferably lower than 8 mg KOH per gram of polyol (A1) or even lower than 7 mg KOH per gram of polyol (A1).

The polyacrylate polyol (A1) used in the polyol component (A) and composition of the Invention has a hydroxyl value of between 60 and 300 mg KOH/g polyol (A1), preferably between 80 and 280 mg KOH/g polyol (A1), more preferably between 100 and 250 mg KOH/g polyol (A1), even more preferably between 110 and 195 mg KOH/g polyol (A1), and most preferably between 120 and 180 mg KOH/g polyol (A1).

The hydroxyl value is measured according to the method ASTM E222-17 standard.

Preferably, the polyacrylate polyol (A1) used in the polyol component (A) and crosslinkable composition of the invention has a Mn of lower than 2,000 Dalton, preferably lower than 1,600 Dalton; a Mw of lower than 4,000 Dalton, preferably lower than 3,500 Dalton, more preferably lower than 2,500 Dalton; a polydispersity lower than 4, preferably lower than 3, more preferably lower than 2.5; an acid value of between 0 and 15 mg KOH/g polyol (A1), preferably between 0 and 10 mg KOH/g polyol (A1), more preferably between 0 and 8 mg KOH/g polyol (A1); and a glass transition temperature higher than −15° C., preferably higher than 0° C., and lower than 50° C., preferably lower than 35° C., more preferably lower than 30; and comprises from 5 to 50 wt %, based on the sum of (a1), (a4), and, if present, (a2), (a3) and (a5), of (substituted) cycloaliphatic (meth)acrylate monomers (a4), preferably isobornyl (meth) acrylate, 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acylate, (substituted) cyclohexyl (meth)acrylate, or mixtures thereof, more preferably 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acrylate, even more preferably 1,3,3-trimethylbicyclo[2.2.1]heptyl (meth)acrylate, norbornyl (meth)acrylate, (octahydro-4,7-methano-1H-indenyl)methyl (meth)acrylate, monoesters of octahydro-4,7-methano-1H-indenedimethanol and (meth) acrylic acid, or mixtures thereof. The hydroxyalkyl(meth) acrylate monomers (a1) used for obtaining the (meth)acrylic polyol (A1) preferably are hydroxyethyl (meth)acrylate, hydroxypropyl (meth)acrylate, hydroxybutyl (meth)acrylate, or mixtures thereof.

Alternatively, the polyacrylate polyol (A1) (preferably being a random (co)polymer with random distribution of OH functionalities over the polymer chains and no control over the end-group functionalities) used in the polyol component (A) and composition of the invention has a Mn of lower than 1,600 Dalton, preferably lower than 1,400 Dalton, more preferably lower than 1,300 Dalton; a Mw of lower than 2,900 Dalton, preferably a Mw of lower than 2,500 Dalton, more preferably lower than 2,200 Dalton, even more preferably lower than 2,000 Dalton; a polydispersity lower than 4, preferably lower than 3, more preferably lower than 2.5; an acid value of between 0 and 15 mg KOH/g polyol (A1), preferably between 0 and 10 mg KOH/g polyol (A1); and a glass transition temperature higher than −15° C., preferably higher than 0° C., and lower than 50° C., preferably lower than 35° C., more preferably lower than 30° C.; and comprises from 5 to 50 wt %, preferably from 10 to 45 wt %, more preferably from 10 to 40 wt %, most preferably from 15 to 35 wt %, based on the sum of (a1), (a4), and, if present. (a2), (a3) and (a5), of (substituted) cycloaliphatic (meth) acrylate monomers (a4), preferably isobornyl (meth)acrylate, 2,6,6-trimethylbicyclo[3.1.1]heptyl (meth)acrylate, 1,3,3-trimethylbicyclo[2.2.1]heptyl (meth)acrylate. (octahydro-4,7-methano-1H-indenyl)methyl (meth)acrylate, esters of isomers of octahydro-4,7-methano-1H-indenedimethanol and (meth)acrylic acid, (substituted) cyclohexyl (meth)acrylate, or mixtures thereof, more preferably isobornyl (meth) acrylate. The hydroxyalkyl(meth)acrylate monomers (a1) used for obtaining the (meth)acrylic polyol (A1) preferably are hydroxyethyl (meth)acrylate, hydroxypropyl (meth) acrylate, hydroxybutyl (meth)acrylate or mixtures thereof, more preferably hydroxyethyl (meth)acrylate, hydroxypropyl (meth)acrylate, hydroxybutyl methacrylate, most preferably hydroxyethyl (meth)acrylate, hydroxypropyl (meth) acrylate, or mixtures thereof. More preferably the hydroxyalkyl(meth)acrylate monomers (a1) used for obtaining the (meth)acrylic polyol (A1) comprise more than 50 wt %, preferably more than 60 wt %, more preferably more than 80 wt %, most preferably more than 90 wt % or even 100 wt % of hydroxyalkyl methacrylate monomers (a1") based on the total weight of hydroxyalkyl (meth)acrylate monomers (a1). Even more preferably, the hydroxyalkylmethacrylate monomers (a1") are hydroxyethylmethacrylate, hydroxypropylmethacrylate, hydroxybutylmethacrylate, or mixtures thereof, most preferably hydroxyethylmethacrylate, hydroxypropylmethacrylate, or mixtures thereof.

In the context of the present description, the wording "at least one" refers to one, two, three, or more.

In the context of the present description, the wording "at least one polyacrylate polyol (A1)" refers to one, or two, three, or more polyacrylate polyols. More particularly, it refers to one polyacrylate polyol (A1), or to a mixture of two, three, or more polyacrylate polyols such as described here above in relation with polyacrylate polyol (A1), the polyacrylate polyols in such a mixture being further denoted as (A1-1), (A1-2), (A1-3), etc. and each having a different monomer composition and/or different Mn and/or different Mw compared to one another. For example, a mixture of two polyacrylate polyols comprises a polyacrylate polyol (A1-1) and a polyacrylate polyol (A1-2) which is different from polyacrylate polyol (A1-1), more particularly polyacrylate polyols (A1-1) and (A1-2) having a different monomer composition.

The polyol component (A) according to the invention may optionally comprise a solvent (A2) which can be the same solvent as used during the polymerization reaction as mentioned above, or it can be a different solvent. Solvent (A2) in the polyol component (A) can also comprise a mixture of different (types of) solvents. Normally, solvent (A2) has a boiling point at atmospheric pressure of 200° C. or less.

The polyol component (A) according to the invention may optionally comprise one or more additives (A3). Additives also encompass auxiliaries commonly used in coating compositions. These additives are commonly used in smaller amounts to improve certain important paint properties. These additives may comprise a volatile part comprising a solvent with a boiling point at atmospheric pressure of 200° C. or less and a non-volatile part. Examples of such additives are surfactants, levelling agents, wetting agents, anti-cratering agents, antifoaming agents, heat stabilizers, light stabilizers, UV absorbers, antioxidants. Furthermore, the polyol component (A) may also comprise polyol (B), pot life extender (E), reactive diluent (F) and/or anti-sagging agent (G) as described below.

The polyol component (A) according to the invention preferably comprises:

from 35 to 100, preferably from 40 to 90, most preferably from 50 to 85, % by weight of polyacrylate polyol (A1);

from 0 to 50, preferably from 10 to 40, most preferably from 15 to 30, % by weight of solvent (A2);

from 0 to 10, preferably from 0 to 8, most preferably from 0.1 to 7, % by weight of additives (A3);

from 0 to 40, preferably from 0 to 30, most preferably from 5 to 25, % by weight of at least one polyol (B) being different from polyacrylate polyol (A1) and comprising at least two free hydroxyl groups;

from 0 to 5, preferably from 0 to 4, most preferably from 0.1 to 2, % by weight of pot life extender (E);

from 0 to 20, preferably from 0 to 15, most preferably from 1 to 10, % by weight of reactive diluent (F); and/or from 0 to 15, preferably from 0 to 10, most preferably from 1 to 8, % by weight of an anti-sagging agent (G);

relative to the total weight of polyol component (A).

In a more preferred embodiment of the invention, the polyol component (A) comprises (or consists of):

from 35 to 100, preferably from 40 to 90, most preferably from 50 to 85, % by weight of polyacrylate polyol (A1), the (substituted) cycloaliphatic (meth)acrylate monomers (a4) for obtaining (A1) being 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acrylate, or mixtures thereof, preferably 1,3,3-trimethylbicyclo[2.2.1]heptyl (meth)acrylate, norbornyl (meth)acrylate. (octahydro-4,7-methano-1H-indenyl)methyl (meth)acrylate, monoesters of octahydro-4,7-methano-1H-indenedimethanol and (meth)acrylic acid, or mixtures thereof;

from 10 to 40, more preferably from 15 to 30, % by weight of solvent (A2), the solvent (A2) being n-butyl acetate; and from 5 to 35, preferably from 5 to 25, % by weight of at least one polyol (B), polyol (B) being a polyester polyol and comprising at least two free hydroxyl groups;

relative to the total weight of polyol component (A).

In an alternative preferred embodiment of the invention, the polyol component (A) comprises (or consists of):

from 35 to 100, preferably from 40 to 90, most preferably from 50 to 85, % by weight of polyacrylate polyol (A1), the (substituted) cycloaliphatic (meth)acrylate monomers (a4) for obtaining (A1) being 2,6,6-trimethylbicyclo[3.1.1]heptyl (meth)acrylate, 1,3,3-trimethylbicyclo[2.2.1]heptyl (meth)acrylate, (octahydro-4,7-methano-1H-indenyl)methyl (meth)acrylate, esters of isomers of octahydro-4,7-methano-1H-indenedimethanol and (meth)acrylic acid, norbornyl (meth)acrylate, or mixtures thereof, preferably 1,3,3-trimethylbicyclo[2.2.1]heptyl (meth)acrylate, norbornyl (meth)acrylate, (octahydro-4,7-methano-1H-indenyl)methyl (meth)acrylate, or monoesters of octahydro-4,7-methano-1H-indenedimethanol and (meth)acrylic acid, or mixtures thereof;

from 10 to 40, more preferably from 15 to 30, % by weight of solvent (A2), the solvent (A2) being n-butyl acetate; and from 0 to 40, preferably from 0 to 30, most preferably from 5 to 25, % by weight of at least one polyol (B) being different from polyacrylate polyol (A1) and comprising at least two free hydroxyl groups;

from 0 to 20, preferably from 0 to 15, most preferably from 1 to 10, % by weight of reactive diluent (F);

relative to the total weight of polyol component (A).

Preferably the residual monomer content in the polyol component (A) is less than 15,000 ppm, more preferably less than 10.000 ppm, even more preferably less than 8,000 ppm, most preferably less than 5,000 ppm, based on the total weight of the polyol component (A). The residual monomer content can be determined by the method published by S. Kossen, LC GC Europe, November 2001, page 2.

The flash point of the polyol component (A) is preferably higher than 20° C., more preferably higher than 22° C., even more preferably higher than 25° C., most preferably 27° C. or higher. The flash point can be determined according to ISO 1523.

The polyacrylate polyol (A1) is preferably present in the crosslinkable composition at a level in the range of 10 to 90, more preferably in the range of 20 to 80, most preferably in the range of 30 to 70, percent by weight based on the total amount of polyacrylate polyol (A1), polyol (B) If present, crosslinker (C), and, if present catalyst (D), pot life extender (E), reactive diluent (F), and/or anti-sagging agent (G).

Optionally, the crosslinkable composition according to the invention comprises at least one polyol (B) being different from polyacrylate polyol (A1) and comprising at least two free hydroxyl groups.

The polyols (B), if present, are preferably selected from the group consisting of polyester polyols, polyacrylate polyols (or (meth)acrylic polyols), polycarbonate polyols, polyether polyols, polyurethane polyols, amino resin polyols, and mixtures (or hybrids) thereof. Such polymers are generally known to the skilled person and are commercially available. More preferably, polyol (B) is selected from the group consisting of polyester polyols, polyacrylate polyols, and mixtures (or hybrids) thereof.

Suitable polyester polyols (B) can be obtained, for instance, by the polycondensation of one or more di- and/or higher functional hydroxy compounds with one or more di- and/or higher functional carboxylic acids, optionally in combination with one or more monofunctional carboxylic acids and/or hydroxy compounds. Non-limiting examples of monocarboxylic acids are linear or branched alkyl carboxylic acids comprising 4 to 30 carbon atom, preferred are for example stearic acid, 2-ethylhexanoic acid or isononanoic acid. As non-limiting examples, di- and/or higher functional hydroxy compounds can be one or more alcohols selected from the group consisting of ethylene glycol, neopentyl glycol, 1,3-propanediol, 1,4-butanediol, isosorbide, spiroglycol, trimethylol propane, glycerol, trihydroxyethyl isocyanurate and pentaerythritol. As non-limiting examples, the di- and/or higher functional carboxylic acids are one or more selected from the group consisting of succinic acid, adipic acid, sebacic acid, 1,4-cyclohexyl dicarboxylic acid, hexahydrophthalic acid, terephthalic acid, isophthalic acid, phthalic acid and functional equivalents thereof. Polyester polyols can be prepared from di and/or higher functional hydroxy compounds and from carboxylic acids, and/or anhydrides and/or C1-C4 alkyl esters of the acids.

Suitable (meth)acrylic polyols (or polyacrylate polyols) (B) can be obtained, for instance, by the (co)polymerization of hydroxy-functional (meth)acrylic monomers with other ethylenically unsaturated comonomers in the presence of a free radical initiator. As a non-limiting example, the (meth) acrylic polyol can include residues formed from the polymerization of one or more hydroxyalkyl esters of (meth) acrylic acid, such as for example hydroxyethyl (meth) acrylate, hydroxypropyl (meth)acrylate, hydroxybutyl (meth)acrylate, polyethylene glycol esters of (meth)acrylic acid, polypropylene glycol esters of (meth)acrylic acid, and mixed polyethylene glycol and polypropylene glycol esters of (meth)acrylic acid. The (meth)acrylic polyol further preferably comprises monomers not containing hydroxyl groups such as methyl (meth)acrylate, tert-butyl (moth)acrylate, (substituted) cyclopentyl (meth)acrylate, (substituted) cyclohexyl (meth)acrylate, (substituted) cycloheptyl (meth) acrylate, isomers of limonene (meth)acrylate, isomers of carvone (meth)acrylate, isomers of pinene (meth)acrylate, isosorbide (meth)acrylate, 3,3,5-trimethylcyclohexyl (meth) acrylate, esters of (meth)acrylic acid and hydroxylated (substituted) decalin, esters of (meth)acrylic acid and hydroxylated (substituted) bicycloalkyl, isomers of dimethylbicyclo [2.2.1]heptyl (meth)acrylate, isomers of ethylbicyclo[2.2.1] heptyl (meth)acrylate, isomers of ethyldimethylbicyclo [2.2.1]heptyl (meth)acrylate, isomers of diethylmethylbicyclo[2.2.1]heptyl (meth)acrylate, isomers of trimethylbicyclo[2.2.1]heptyl (meth)acrylate, isomers of trimethylbicyclo[3.1.1]heptyl (meth)acrylate, (octahydro-4, 7-methano-1H-indenyl)methyl (meth)acrylate, esters of isomers of octahydro-4,7-methano-1H-indenedimethanol and (meth)acrylic acid, isobornyl (meth)acrylate, (substituted) norbornyl (meth)acrylate, isomers of bicyclo[2.2.1]hept-5-en-2-ylmethyl (meth)acrylate. (substituted) adamantyl (meth)acrylate, (substituted) dicyclopentadiene (meth)acrylate, (substituted) bicyclo[2.2.2]octyl (meth)acrylate, (substituted) bicyclo[4.2.0]octyl (meth)acrylate, and (substituted) polycyclopentadienyl (meth)acrylate, isobutyl (meth) acrylate, (meth)acrylic acid; more preferably methyl (meth) acrylate, tert-butyl (meth)acrylate, (substituted) cyclopentyl (meth)acrylate, (substituted) cyclohexyl (meth)acrylate, (substituted) cycloheptyl (meth)acrylate, 3,3,5-trimethylcyclohexyl (meth)acrylate, isobornyl (meth)acrylate, (substituted) norbornyl (meth)acrylate, isomers of bicyclo(2.2.1) hept-5-en-2-ylmethyl (meth)acrylate, (substituted) adamantyl (meth)acrylate, (substituted) dicyclopentadiene (meth)acrylate, and (substituted) polycyclopentadienyl (meth)acrylate, isobutyl (meth)acrylate, (meth)acrylic acid. The (meth)acrylic polyol optionally comprises non(meth) acrylate monomers such as styrene, vinyl toluene or other substituted styrene derivatives, vinyl esters of (branched) monocarboxylic acids, maleic acid, fumaric acid, itaconic acid, crotonic acid and monoalkylesters of maleic acid. Preferably, the amount of (substituted) cycloaliphatic (meth) acrylate monomers relative to the total monomer composition of polyacrylate polyol (B) is less than 15%, more preferably less than 10%, most preferably less than 5%.

If present, the polyester polyol (B) used in the composition according to the invention preferably has a weight averaged molecular weight Mw of at least 600 Dalton, more preferably of at least 800 Dalton. The polyester polyol (B) used in the composition according to the invention preferably has a weight averaged molecular weight Mw of less than 10,000 Dalton, more preferably less than 9,000 Dalton. The number averaged molecular weight Mn of polyester polyol (B) Is preferably higher than 500 Dalton, more preferably higher than 600 Dalton. The number averaged molecular weight Mn of polyester polyol (B) is preferably at most 6,000 Dalton, more preferably at most 5,000 Dalton.

If present, the polyacrylate polyol (B) used in the composition according to the invention preferably has a weight averaged molecular weight Mw of at least 800 Dalton, more preferably of at least 1,000 Dalton, most preferably of at least 1,200 Dalton. The polyacrylate polyol (8) used in the composition according to the invention preferably has a weight averaged molecular weight Mw of less than 10,000 Dalton, more preferably less than 9,000 Dalton. The number averaged molecular weight Mn of polyacrylate polyol (B) is preferably higher than 500 Dalton, more preferably higher than 600 Dalton, most preferably higher than 700 Dalton. The number averaged molecular weight Mn of polyacrylate polyol (B) is preferably at most 6,000 Dalton, more preferably at most 5,000 Dalton.

The polydispersity, defined as Mw/Mn, of polyol (B) used in the composition of the invention (if present) is preferably less than 5, more preferably less than 4, most preferably less than 3.

The glass transition temperature Tg of polyol (B) used in the composition of the invention (if present) is preferably higher than −70° C., more preferably higher than −60° C., most preferably higher than −50° C. The glass transition temperature of polyol (B) preferably does not exceed 90° C., more preferably does not exceed 75° C. The Tg is measured using a Mettler DSC 3+ calorimeter according to DIN EN ISO 16805 and ISO 11357.

If present, the polyol (B) used in the composition according to the present invention preferably has a hydroxyl value in the range of 40 to 400 mg KOH per gram of polyol (B), more preferred in the range of 50 to 300 mg KOH per gram of polyol (B) and most preferred in the range of 80 to 250 mg KOH per gram of polyol (B). The hydroxyl value is measured according to the method ASTM E222-17 standard.

The acid value (AV) of polyol (B) used in the composition of the invention (if present) is preferably lower than 20 mg KOH per gram of polyol (B), preferably lower than 15 mg KOH per gram of polyol (B), more preferably lower than 10 than mg KOH per gram of polyol (B).

If present, the polyol (B) used in the composition according to the present invention preferably has a hydroxyl value in the range of 40 to 400 mg KOH per gram of polyol (B) and/or an acid value of between 0 and 20 mg KOH per gram of polyol (B).

If present, the polyol (B) is preferably present in the composition at a level in the range of 0 to 90, more preferably in the range of 10 to 80, most preferably in the range of 20 to 70, percent by weight based on the total amount of polyacrylate polyol (A1), polyol (B) If present, crosslinker (C), and, if present catalyst (D), pot life extender (E), reactive diluent (F), and/or anti-sagging agent (G).

Crosslinker (C) generally comprises an oligomeric or polymeric compound with at least two functional groups reactable with polyacrylate polyol (A1) and/or polyol (B) if present and/or reactive diluent (F) If present.

Crosslinker (C) is preferably selected from the group consisting of isocyanates, blocked isocyanates, amino resins such as melamine-formaldehyde resins and formaldehyde free based resins, and mixtures of amino resins with (blocked) isocyanates.

Melamine-formaldehyde resins are very well known and have been commercialized since long, and may be obtained from allnex under the tradenames of CYMEL® and SETAMINE®.

These melamine-formaldehyde resins, optionally in solution in corresponding organic solvents, comprise products with various degrees of methylolation, degrees of etherification or degrees of condensation (monocyclic or polycyclic). Preferred melamine-formaldehyde resins are those sold under the names of CYMEL®202, CYMEL®232, CYMEL® 235, CYMEL® 238, CYMEL® 254, CYMEL® 266, CYMEL® 267, CYMEL® 272, CYMEL® 285, CYMEL® 301, CYMEL® 303, CYMEL® 325, CYMEL 327, CYMEL® 350, CYMEL® 370, CYMEL® 701, CYMEL® 703, CYMEL® 736, CYMEL® 738, CYMEL® 771, CYMEL® 1141, CYMEL® 1156, CYMEL® 1158, CYMEL® 1168, CYMEL® NF 2000, CYMEL® NF 2000A, SETAMINE® US-132 BB-71, SETAMINE® US-134 BB-57, SETAMINE® US-138 BB-70, SETAMINE® US-144 BB-60, SETAMINE® US-146 BB-72, SETAMINE® US-148 BB-70, or mixtures thereof. Particularly preferred are SETAMINE® US-138 BB-70, CYMEL® 327, CYMEL® NF 2000, CYMEL® NF 2000A, or mixtures thereof.

Crosslinker component (C) can also comprise an isocyanate compound with at least two free —NCO (isocyanate) groups. Isocyanate crosslinkers are well known and have extensively been described in the art. The isocyanate compound is usually selected from the group consisting of aliphatic, cycloaliphatic, and aromatic polyisocyanates comprising at least 2 —NCO groups, and mixtures thereof. The crosslinker (C) is then preferably selected from the group consisting of hexamethylene diisocyanate, 2,4,4-trimethyl hexamethylene diisocyanate, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis (isocyanate methyl) benzene, xylylene diisocyanate, α,α,α',α'-tetramethyl xylylene diisocyanate (TMXDI®), 1,5-dimethyl-2,4-bis (isocyanate methyl) benzene, 2,4- and 2,6-toluene diisocyanate, 2,4,6-toluene triisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates. Other preferred isocyanate crosslinkers are the adducts of polyisocyanates, e.g., biurets, isocyanurates, imino-oxadiazinediones, allophanates, uretdiones, or mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (available under the trade name DESMODUR® (E) N3390 or TOLONATE® HDT-LV, a mixture of the uretdione and the isocyanurate of hexamethylene diisocyanate, under the trade name DESMODUR® N3400, the allophanate of hexamethylene diisocyanate, available under the trade name DESMODUR® LS 2101, and the isocyanurate of isophorone diisocyanate, available under the trade name VESTANAT® T1890. Furthermore, (co)polymers of isocyanate-functional monomers such as α,α'-dimethyl-m-isopropenyl benzyl isocyanate are suitable for use. If desired, it is also possible to use hydrophobically or hydrophilically modified polyisocyanates to impart specific properties to the coating.

Crosslinker component (C) can also comprise blocked isocyanates when blocking agents having a sufficiently low deblocking temperature are used to block any of the polyisocyanate crosslinker component (C) mentioned above. In that case, crosslinker component (C) is substantially free of unblocked isocyanate group-containing compounds and the crosslinkable composition can be formulated as one-component formulation. The blocking agents which can be used to prepare a blocked isocyanate component are well-known to the skilled worker.

The crosslinker (C) is preferably present in the composition at a level in the range of 10 to 90, more preferably in the range of 20 to 80, most preferably in the range of 30 to 70, percent by weight based on the total amount of polyacrylate polyol (A1), polyol (B) if present, crosslinker (C), and, if present catalyst (D), pot life extender (E), reactive diluent (F), and/or anti-sagging agent (G).

The crosslinkable composition according to the invention preferably comprises the polyacrylate polyol (A1), the polyol (B) if present, the reactive diluent (F) if present, and polyisocyanate crosslinker (C) in an amount such that the equivalent ratio of isocyanate-functional groups to hydroxyl groups is preferably between 0.5 and 4.0, more preferably between 0.7 and 3.0, and most preferably between 0.8 and 2.5.

The crosslinkable composition can optionally comprise a catalyst (D) for catalysing the reaction between —OH groups of polyacrylate polyol (A1) and/or the polyol (B) if present and/or reactive diluent (F) if present, and crosslinker (C). The person skilled in the art will know that the type of catalyst (D) will in general depend on the type of crosslinker component.

In one embodiment, catalyst (D) is an organic acid, more particularly selected from the group consisting of sulfonic acids, carboxylic acids, phosphoric acids and/or acidic phosphoric esters. Preferred are sulfonic acids. Examples of suitable sulfonic acids are dodecylbenzenesulfonic acid (DDBSA), dinonylnaphthalenedisulfonic acid (DNNSA), para-toluenesulfonic acid (pTSA). An acid catalyst can be also used in blocked form. As a result, as is known, improvement is obtained in, for example, the shelf life of the compositions comprising blocked catalysts. Examples of suitable agents for blocking acid catalysts are amines such as preferably tertiary-alkylated or heterocyclic amines. Blocked sulfonic acid catalysts can for example be blocked DDBSA, blocked DNNSA or blocked p-TSA. This blocking of the sulfonic acid catalysts takes place, for example, likewise via amines such as preferably tertiary-alkylated or heterocyclic amines, such as 2-amino-2-methylpropanol, diisopropanolamine, dimethyloxazolidine or trimethylamine, for example. Alternatively, $NH_3$, optionally dissolved in an organic solvent or in water, could be used to block sulfonic acid catalysts. Also possible is the use of covalently blocked sulfonic acid catalysts. In this case, blocking takes place using covalently bonding blocking agents such as epoxy compounds or epoxy-isocyanate compounds, for example. Blocked sulfonic acid catalysts of these kinds are described in detail in the patent publication U.S. Pat. No. 5,102,961. Catalysts are available, for example, under the trade name CYCAT® (from allnex) or NACURE®, and can be used directly in the composition of the invention.

In another embodiment, the catalyst (D) is a metal-based catalyst. Preferred metals in the metal-based catalyst include tin, bismuth, zinc, zirconium and aluminium. Preferred metal-based catalysts (D) are carboxylate or acetylacetonate complexes of the aforementioned metals. Preferred metal-based catalysts (D) optionally used in the present invention are tin-, bismuth- or zinc-carboxylates, more specifically preferred are dimethyl tin dilaurate, dimethyl tin diversatate, dimethyl tin dioleate, dibutyl tin dilaurate, dioctyl tin dilaurate, tin octoate, zinc 2-ethylhexanoate, zinc neodecanoate, bismuth 2-ethylhexanoate, or bismuth neodecanoate. Also suitable are dialkyl tin maleates, or dialkyl tin acetates. It is also possible to use mixtures and combinations of metal-based catalysts, mixtures of (blocked) acid catalysts, or mixtures of metal-based catalysts with (blocked) acid catalysts.

Typically, the catalyst (D) is present in the composition according to the invention in an amount between 0 and 10, preferably from 0.001 to 5, more preferably from 0.002 to 5, even more preferably from 0.002 to 3, most preferably from 0.005 to 1, % by weight of the polyacrylate polyol (A1), polyol (B) if present, crosslinker (C), and, if present catalyst (D), pot life extender (E), reactive diluent (F), and/or anti-sagging agent (G).

Optionally, the crosslinkable composition according to the invention comprises at least one pot life extender (E). This can be any type of pot life extender and many different types of pot life extenders are known to the skilled person. Well-known are for example pot life extenders of the types of beta-diketones, beta-keto esters and alpha-hydroxy ketones. Examples of such compounds are 2,4-pentanedione, 1,1,1-trifluoro-2,4-pentanedione, 1,1,1,5,5,5-hexafluoro-2,4-pentanedione, 2,4-hexanedione, 2,4-heptanedione, 5-methyl-2,4-hexanedione 2,4-octanedione, 5,5-dimethyl-2,4-hexanedione, 3-ethyl-2,4-pentanedione, 2,4-decanedione, 2,2-dimethyl-3,5-nonanedione, 3-methyl-2,4-pentanedione, 2,4-tridecanedione, 1-1-cyclohexyl-1,3-butanedione, 5,5-dimethyl-1,3-cyclohexanedione, 1,3-cyclohexanedione, 1-phenyl-1,3-butanedione, 1(4-biphenyl)-1,3-butanedione, 1-phenyl-1,3-pentanedione, 3-benzyl-2,4,-pentanedione, 1-phenyl-5,5-dimethyl-2,4-hexanedione, 1-phenyl-2-butyl-1,3-butanedione, 1-phenyl-3-(2-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione, dibenzoylmethane, methyl acetoacetate, ethyl acetoacetate, alpha-methyl ethyl acetoacetate, alpha-n-butyl ethylacetoacetate, alpha-secbutyl ethyl acetoacetate, alpha ethyl methyl acetoacetate, and alpha-ethyl ethyl acetoacetate, alpha-acetyl-butyrolactone, dimedone and 1-hydroxyanthraquinone, benzoin, acetoin and alpha-hydroxy acetophenone. The particularly preferred pot life extender compound of this class is 2,4-pentanedione.

Another class of pot life extender (E) which is particularly useful in the crosslinkable composition according to the invention are carboxylic acids, preferably monofunctional carboxylic acids such as acetic acid, butyric acid, propionic acid, acrylic acid, methacrylic acid, phenylacetic acid, benzoic acid, p-methylbenzoic acid, p-nitrobenzoic acid, p-chlorobenzoic acid, p-methoxybenzoic acid, isononanoic acid, 2-ethylhexanoic acid, pentanoic acid, 3-methylbutanoic acid, neodecanoic acid, versatic acid, 3-hydroxy-2,2-dimethylpropionic acid, 2,2-bis(hydroxymethyl)propionic acid, abietic acid, 1-methyl cyclohexanoic acid, dimetylmalonic acid, ethylmethylmalonic acid, diethylmalonic acid, 2,2-dimethylsuccinic acid, 2,2-diethylsuccinic acid, 2,2-dimethylglutaric acid, 2,2-dimethylpropionic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, 3-methylisocitric acid, 4,4-dimethylaconitic acid, 1-methylcyclopentane carboxylic acid, 1,2,2-trimethyl-1,3-cyclopentane dicarboxylic acid, 1-methylcyclohexane carboxylic acid, 2-methylbicyclo[2.2.1]-5-heptene-2-carboxylic acid, 2-methyl-7-oxabicyclo[2.2.1]-5-heptene-2-carboxylic acid, 1-adamantane carboxylic acid, bicyclo[2.2.1]heptane-1-carboxylic acid, bicyclo[2.2.2]octane-1-carboxylic acid, or mixtures thereof. Preferred are acetic acid, propionic acid, isononanoic acid, benzoic acid, or any of the tertiary acids, or mixtures thereof.

Another type of pot life extender (E) particularly useful in the crosslinkable composition according to the invention are compounds of the general formula R—SH, wherein R can be an alkyl, alkenyl, aryl or aralkyl group. The —SH group can be a primary, secondary or tertiary —SH group. R can be a linear, cyclic or branched group and can comprise one or more other functional groups such as for example hydroxyl groups, primary, secondary or tertiary amine groups, silane or siloxane groups, ether groups, ester groups, carboxylic acid groups.

Preferably R is a linear or branched alkyl group of the general formula $—C_nH_{2n+1}$ wherein n is from 4 to 40, more preferably from 8 to 30. Examples are $n\text{-}C_{12}H_{25}SH$, $n\text{-}C_{10}H_{33}SH$, linear or branched molecules of formula $C_{11}H_{23}SH$, $C_{12}H_{25}SH$ and $C_{13}H_{27}SH$, as well as mixtures thereof, and $(CH_3)_2(iPr)C—C(CH_3)_2—C(CH_3)_2SH$. If R contains more than one other functional groups, these can be different or the same. Particularly hydroxyl or ester groups are preferred as other functional group. In case of R containing an ester group, R preferably has the general formula $—(CH_2)_n(C{=}O)O—R'$. Herein, n can be chosen in the range of 1-20, preferably in the range of 1-10 and particularly preferred n is 1 or 2. R' can be any alkyl, alkenyl, aryl or aralkyl group, preferably containing from 1 to 24 carbon atoms, such as for example butyl, 2-ethylhexyl, iso-octyl, tridecyl, octadecyl. Particularly preferred are complexing agents of formula $HS—(CH_2)_n(C{=}O)O—R'$, wherein n is 1 or 2 and wherein R' is an alkyl group containing from 3 to 20 carbon atoms.

The pot life extender (E) when chosen from the type R—SH can contain multiple —SH groups. Preferred are compounds of formula $HS—(CH_2)_x—SH$ wherein x=1 to 20, compounds of formula $(HSCH_2)_{4-m}C(CH_2SCH_2CH_2SH)_m$, wherein m=1 to 4 and similar compounds such as for example described in patents EP 0665219 and EP 0435306. Other complexing agents (E) which are particularly preferred are esters from SH-functional acids, especially SH-functional carboxylic acids, and a polyol. Not necessarily limiting to condensation reaction synthesis only, such products can be obtained by the formation of (poly) ester bonds between for example $HS(CH_2)_nCOOH$ (wherein n=1 to 20) and a polyol. Preferred are those which are the reaction products of carboxylic acids of formula $HS(CH_2)_nCOOH$ wherein n is from 1 to 20 and a polyol having an OH-functionality of 2 or more. In this case, the polyol has usually an OH-functionality of 2 or more and can be monomeric, oligomeric or polymeric. Non-limiting examples of such polyols can be glycol, glycerol, trimethylolpropane, neopentyl glycol, pentaerythritol, dipentaerythritol, ethoxylated trimethylolpropane, tri(hydroxyethyl)isocyanurate, castor oil, OH functional polyester, OH functional polyacrylate, polycaprolactone, OH functional polycarbonate, polymers based on diepisulphide monomers as described in U.S. Pat. No. 6,486,298.

Mixtures of different types of pot life extender (E) can be used, such as for example mixtures of a carboxylic acid and a compound described by formula R—SH.

Preferably, the pot life extender (E) is present in the composition at a level in the range of 0 to 10, more preferred 0.1 to 5, most preferred 0.2 to 2, percent by weight based on the total amount of polyacrylate polyol (A1), polyol (B) if present, crosslinker (C), and, if present catalyst (D), pot life extender (E), reactive diluent (F), and/or anti-sagging agent (G).

Optionally, the crosslinkable composition may further comprise a reactive diluent (F). Reactive diluents generally are monomeric, oligomeric or polymeric compounds, used to reduce the viscosity of polyacrylate polyol (A1) and/or optional polyol (B), and which can react with polyacrylate polyol (A1), polyol (B), and/or crosslinker (C). Preferably, reactive diluent (F) is not volatile and therefore does not contribute to the total volatile organic compound content of the composition.

Preferably, reactive diluent (F) has a number averaged molecular weight ranging from 62 to 4,000 Dalton, more preferably from 62 to 2,000 Dalton, most preferably from 62 to 1,000 Dalton, a polydispersity Mw/Mn ranging from 1 to 3, preferably from 1 to 1.5, more preferably from 1 to 1.3, even more preferably from 1 to 1.25, and an average hydroxyl functionality ranging from 1 to 6, preferably from 1.5 to 4, more preferably from 1.8 to 3.5.

Preferred reactive diluents are monomeric, oligomeric or polymeric compounds comprising one —OH group, or monomeric, oligomeric or polymeric compounds comprising 2 to 5 —OH groups, or mixtures thereof, which can react with polyacrylate polyol (A1), polyol (B), and/or crosslinker (C), and which preferably react with crosslinker (C) usually under the influence of the catalyst (D), and which are used to reduce the viscosity of polyacrylate polyol (A1) and/or optional polyol (B). Preferred types of reactive diluent (F) are monofunctional alcohols, diols, or triols, comprising 1, 2, or 3 —OH groups, respectively. Preferably, reactive diluent (F) is of the type of diol or triol, and is a liquid compound comprising between 2 and 40 carbon atoms, preferably between 2 and 20 carbon atoms, more preferably between 2 and 12 carbon atoms. Examples of such diol or triol reactive diluent (F) are ethylene glycol, diethylene glycol, triethylene glycol, 1,2-propylene glycol, 1,3-propylene glycol, 1,1-dimethyl-1,2-ethanediol, dipropylene glycol, tetraethylene glycol, pentaethylene glycol, tripropylene glycol, 1,4-butanediol, 1,5-pentanediol, 2-ethyl-1,3-propanediol, 2-methyl-1,3-propanediol, 2-methyl-1,5-pentanediol, 2-ethyl-1,4-butanediol, 2-ethyl-1,3-hexanediol, 2,4-diethyloctane-1,3-diol, 1,3-bis(hydroxymethyl)cyclohexane, 1,3-cyclohexanediol, glycerol, polyTHF having a molar weight between 162 and 4500, preferably 250 to 2000, poly-1,3-propanediol (or polypropylene glycol) having a molar weight between 134 and 4000, or polyethylene glycol having a molar weight between 200 and 2000, or mixtures thereof. Also suitable are the commercially available glycols marketed under the name CARBOWAX™ such as poly(ethyleneglycol) and poly(propylene glycol) which have an average molecular weight of about 300 to about 700. In another preferred embodiment, reactive diluent (F) may comprise an oligomeric or polymeric polyol. Such reactive diluents (F) are well known and commercially available for example under the tradename of SETAL® 1406. Reactive diluent (F) may also comprise a mixture of an oligomeric or polymeric polyol and one or more of the above mentioned diols, triols and/or any liquid monofunctional alcohol, preferably a mixture of an oligomeric or polymeric polyol and one or more of the above mentioned diols or triols.

Most preferred are those reactive diluents (F) of the type of diol having a melting point of higher than—60° C., preferably higher than—50° C. and a boiling point of higher than 200° C., preferably higher than 220° C. and having between 5 and 12 carbon atoms, preferably between 6 and 10 carbon atoms.

Preferably, the reactive diluent (F) is present in the crosslinkable composition at a level in the range of 0 to 20, more preferred 0 to 15, most preferred 5 to 15, percent by weight based on the total amount of polyacrylate polyol (A1), polyol (B) if present, crosslinker (C), and, if present catalyst (D), pot life extender (E), reactive diluent (F), and/or anti-sagging agent (G).

The composition according to the invention may optionally comprise one or more volatile organic compounds. In general, these are compounds with a boiling point at atmospheric pressure of 200° C. or less, and these are used to dilute the composition to a viscosity suitable to apply the composition. If necessary, a viscosity suitable to apply the composition can therefore be obtained by using a reactive diluent (F) or by using volatile organic compounds, or a mixture of a reactive diluent (F) and volatile organic compounds.

Preferably, the (unpigmented) crosslinkable composition comprises less than 460 g/l of volatile organic compound based on the total composition, more preferably less than 420 g/l, most preferably less than 400 g/l.

Examples of suitable volatile organic compounds are hydrocarbons, such as toluene, xylene, SOLVESSO® 100, ketones, terpenes, such as dipentene or pine oil, halogenated hydrocarbons, such as dichloromethane, ethers, such as ethylene glycol dimethyl ether, esters, such as ethyl acetate, ethyl propionate, n-butyl acetate or ether esters, such as methoxypropyl acetate or ethoxyethyl propionate. Also mixtures of these compounds can be used.

If so desired, it is possible to include one or more so-called "exempt solvents" in the composition of the invention. An exempt solvent refers to a volatile organic compound that does not participate in an atmospheric photochemical reaction to form smog. It can be an organic solvent, but as it takes so long to react with nitrogen oxides in the presence of sunlight, the Environmental Protection Agency of the United States of America considers its reactivity to be negligible. Examples of exempt solvents that are approved for use in paints and coatings include acetone, methyl acetate, parachlorobenzotrifluoride (commercially available under the name OXSOL® 100), and volatile methyl siloxanes. Also tertiary butyl acetate is being considered as an exempt solvent.

Preferably, the non-volatile content of the composition according to the invention at application viscosity, referred to as the solids content, is higher than 54 weight-% based on the total composition, more preferably higher than 56 weight-%, even more preferably higher than 58 weight-%, or most preferably higher than 60 weight-%.

In the present application, solids content of the (unpigmented) composition refers to the amount of matter that results after applying and curing (or crosslinking) the composition, and after subsequent evaporation of the volatile organic compounds. The solids content at application viscosity can be calculated by the following equation. Eq. (I):

Solids content [wt %]={Sum of weight of [(polyacrylate polyol (*A*1)+polyol (*B*) if present+crosslinker (*C*)+catalyst (*D*) If present+pot life extender (*E*) if present+reactive diluent (*F*) if present+anti-sagging agent (*G*) if present+non-volatile parts of coating additives if present))/(total weight of sprayable composition−weight of pigments−weight of fillers]}*100

The crosslinkable composition according to the invention may be used and applied with a very small amount of volatile components, preferably less than 15% relative to the total weight of the (unpigmented) crosslinkable composition, more preferably less than 10%, most preferably less than 5% or even without volatile components, in particular when one or more reactive diluents (F) as described here above are used and/or in applications where higher application viscosity is needed.

Methods for measuring the application viscosity (i.e. the viscosity suitable to apply a composition) are known to the skilled person. It will be apparent for those skilled in the art to select an appropriate method depending on the desired paint application.

In addition to the components described above, other compounds can be present in the crosslinkable composition according to the present invention. Such compounds may be binders other than polyacrylate polyol (A1), polyol (B) and/or reactive diluent (F), and may comprise reactive groups which may be crosslinked with the aforesaid polyacrylate polyol (A1), polyol (B) or reactive diluent (F) if present, and/or crosslinkers (C). Examples of such other compounds are ketone resins, and latent amino-functional compounds such as oxazolidines, ketimines, aldimines, and diimines. These and other compounds are known to the skilled person and are mentioned, int. al., in U.S. Pat. No. 5,214,086.

The crosslinkable composition of the invention may further comprise other ingredients, (coating) additives or auxiliaries commonly used in coating compositions, such as pigments, dyes, surfactants, pigment dispersion aids, levelling agents, wetting agents, anti-cratering agents, antifoaming agents, matting agents, anti-sagging agents, anti-oxidants, radical scavengers, heat stabilizers, light stabilizers. UV absorbers, radical inhibitors, scratch resistance additives and fillers.

Preferably the crosslinkable composition also comprises one or more anti-sagging agents (G).

Anti-sagging agents (G) are rheologically active compounds providing thixotropic properties to the crosslinkable composition. These anti-sagging agents (G) are well known and are generally chosen from clay anti-sagging agents, silica-based anti-sagging agents, microgel anti-sagging agents, amide based anti-sagging agents or anti-sagging agents based on polyurea products. If the crosslinkable composition of the invention comprises an anti-sagging agent (G), preferably the crosslinkable composition comprises an anti-sagging agent based on a polyurea product (in the present description referred to as polyurea anti-sagging agent (G1)).

If present, the anti-sagging agents (G) are preferably present in the composition at a level in the range of 0 to 10, more preferably in the range of 0.2 to 5, even more preferably in the range of 0.3 to 3, or most preferably in the range of 0.5 to 2.5 percent by weight based on the total amount of polyacrylate polyol (A1), polyol (B) if present, crosslinker (C), and, if present catalyst (D), pot life extender (E), reactive diluent (F), and/or anti-sagging agent (G).

The polyurea anti-sagging agent (G1) is typically prepared by the reaction of a polyisocyanate, its isocyanurate, biuret, uretdione, or other condensed derivatives with at least one mono-amine, or, alternatively, by the reaction of effectively mono-isocyanates (including diisocyanates that have been selectively reacted at one side) with polyamines. The use of the prefix "poly" for polyisocyanates and polyamines indicates that at least two of the mentioned functionalities are present in the respective "poly" compound. It is noted that when a polyurea anti-sagging agent (G1) is prepared by the reaction of amines with a polyisocyanate, it is preferred to prepare a diurea product or a triurea product.

Polyisocyanates are preferably selected from the group consisting of aliphatic, cycloaliphatic, aralkylene, and arylene polyisocyanates, more preferably selected from the group consisting of substituted or unsubstituted linear aliphatic polyisocyanates (and their isocyanurates, biurets, uretdiones) and substituted or unsubstituted aralkylene and cyclohexylene polyisocyanates. Optionally, the polyisocyanate may contain other functional groups such as for example ether functionalities, ester functionalities or urethane functionalities.

The polyisocyanate usually contains 2 to 40 and preferably 4 to 12 carbon atoms between the NCO groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate.

Suitable examples of diisocyanates are preferably selected from the group consisting of tetramethylene-1,4-diisocyanate, hexamethylene-1,6-diisocyanate (HMDI), trans-cyclohexylene-1,4-diisocyanate, dicyclohexylmethane-4,4'-diisocyanate, 1,5-dimethyl-(2,4-[omega]-diisocyanato methyl) benzene, 1,5-dimethyl(2,4-[omega]-diisocyanatoethyl) benzene, 1,3,5-trimethyl(2.4-[omega]-diisocyanato-methyl) benzene, 1,3,5-triethyl(2,4-[omega]-diisocyanatomethyl) benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI). Further suitable polyisocyanates are preferably selected from the group consisting of polyisocyanates based on HMDI, including condensed derivatives of HMDI, such as uretdiones, biurets, isocyanurates (trimers), and asymmetrical trimers, etc., many of which are marketed as Desmodur® N and Tolonate® HDB and Tolonate® HDT. Particularly preferred polyisocyanates are selected from the group consisting of HMDI, its isocyanurate trimer, its biuret (or other condensed derivatives), trans-cyclohexylene-1,4-diisocyanate, para- and meta-xylylene diisocyanate, and toluene diisocyanate.

Most preferably, HMDI, its isocyanurate or other condensed derivatives are selected.

As will be understood by the person skilled in the art, it is also possible to use conventionally blocked polyisocyanates which generate two or more isocyanates in situ, as long as the blocking agent, after splitting, does not prevent the formation of the rheology modification agent according to the invention. Throughout this document the term "polyisocyanate" is used to denominate all polyisocyanates and polyisocyanate-generating compounds.

In accordance with a preferred embodiment of the present invention the amines used to prepare a polyurea anti-sagging agent (G1) comprise mono-amines. Many monoamines can be used in combination with the polyisocyanates to create polyurea reaction products. Aliphatic as well as aromatic amines can be used, and primary as well as secondary amines. Preferably, primary amines are used, of which n-alkylamines and ether-substituted n-alkylamines are particularly useful in accordance with this invention. Optionally, the amines may comprise other functional groups, such as hydroxy groups, ester groups, urethane groups. Preferred monoamines include n-aliphatic amines, especially n-alkylamines such as hexylamine; cyclohexylamine; benzylamine; 3-methoxypropylamine; S-alpha-methylbenzylamine and 2-phenethylamine, as well as mixtures thereof. Specifically preferred polyurea anti-sagging agents (G1) are the adducts of (condensed derivatives of) HMDI and benzylamine or S-alpha-methylbenzylamine or mixtures of benzylamine and S-alpha-methylbenzylamine, and the adducts of (condensed derivatives of) HMDI and 3-methoxypropylamine. The use of diamines (e.g. ethylenediamine) as component next to mono-amines may also be an option to create high melting point polyureas. The monoamine or part of the monoamine used to prepare a polyurea anti-sagging agents (G1) can be a chiral monoamine and polyurea anti-sagging agents as described in U.S. Pat. No. 8,207,268 are considered to be part of this invention.

The polyurea formation reaction may be carried out in the presence of an inert solvent for example acetone, methyl isobutyl ketone, N-methyl pyrrolidone, benzene, toluene, xylene, butyl acetate, an aliphatic hydrocarbon such as petroleum ether, alcohols, water, or mixtures thereof, or In the presence of a binder for the final composition or any other coating formulation component. Here the term “inert” indicates that the solvent does not significantly interfere in the process of polyurea formation, which means that the amount of polyurea formed when solvent is present is at least 80% of the amount produced when no solvent is present.

It will be obvious that if the binder present during preparation of the polyurea anti-sagging agent (G1) is highly reactive with either the amines or the isocyanate, the binder and that particular susceptible compound cannot be premixed. By the term “highly reactive” is meant here that more than 30% of the susceptible amine or isocyanate reacts with the binder before the amine and the isocyanate are mixed in order to prepare the polyurea anti-sagging agent (G1).

According to a preferred embodiment of the invention, the polyurea anti-sagging agent (G1) is prepared in the presence of the polyacrylate polyol (A1), polyol (B) and/or reactive diluent (F). This can be done by mixing a mixture of the polyacrylate polyol (A1), polyol (B) and/or reactive diluent (F) and the isocyanate with the amine components (i.e. by adding the amine components to a mixture of the polyacrylate polyol (A1), polyol (B) and/or reactive diluent (F) and the isocyanate); or by mixing the isocyanate with a mixture of the polyacrylate polyol (A1), polyol (B) and/or reactive diluent (F) and the amine components (i.e. by adding the isocyanate to a mixture of the polyacrylate polyol (A1), polyol (B) and/or reactive diluent (F) and the amine components); or by mixing a (one) mixture of polyacrylate polyol (A1), polyol (B) and/or reactive diluent (F) and the amine components with a (one) mixture of polyacrylate polyol (A1), polyol (B) and/or reactive diluent (F) and the NCO-components (i.e. a mixture of the polyacrylate polyol (A1), polyol (B) and/or reactive diluent (F) and the amine components is added to a mixture of the polyacrylate polyol (A1), polyol (B) and/or reactive diluent (F) and the NCO-components).

It is also possible that small amounts of co-reactive components are intentionally employed in the preparation reaction of the polyurea anti-sagging agent (G1) to act as crystallisation modifiers, and more particularly to modify the crystal sizes upon precipitation or the colloidal stability of the resulting crystals. Equally, dispersant and other adjuvants may be present in any of these introduction steps. The preparation of the polyurea anti-sagging agent (G1) may be carried out in any convenient manner, generally with the reactants being vigorously stirred, in a batch or in a continuous process. Amine components may be added to isocyanate or isocyanate may be added to amine components, whichever is most convenient.

Alternatively the polyurea anti-sagging agent (G1) can be formed in a separate reaction and mixed with the polyacrylate polyol (A1), usually under proper stirring, to form the polyol component (A) or the crosslinkable composition according to the invention.

The relative molar ratio amine/isocyanate is usually between 0.9 and 1.1, preferably between 0.95 and 1.05.

The particle size of a polyurea anti-sagging agent (G1) is preferably less than 15 μm as determined by ISO 1524.

Scratch resistance additives usually are additives to improve important coating properties such as car wash resistance, mar resistance or crock resistance. These scratch resistance additives are well-known and are generally chosen from waxes, siloxane modified polyolefins, organic or inorganic polysilazanes, silane modified components, such as silane modified polyol or silane modified crosslinkers, such as silane modified melamines or isocyanates, or scratch resistance additives based on nanoparticle technology. If the crosslinkable composition of the invention comprises a scratch resistance additive, preferably the crosslinkable composition comprises a scratch resistance additive based on nanoparticle technology, more preferably based on modified nanoparticles having an average diameter between 1 and 400 nanometers, most preferably based on nanoparticles as described in EP210642461. Particularly preferred is the combination of polyacrylate polyol (A1), pot life extender (E) of the type of R—SH and nanoparticles, as described in EP210642481, optionally comprising flow and levelling agents known to the skilled person.

The coating composition according to the invention preferably comprises

- from 10 to 90, preferably from 20 to 80, more preferably from 30 to 70, % of weight of polyacrylate polyol (A1),
- optionally, from 0 to 90, preferably from 10 to 80, more preferably from 20 to 70, % of weight of polyol (B),
- from 10 to 90, preferably from 20 to 80, more preferably from 30 to 70, % of weight of polyisocyanate crosslinker (C),
- optionally, from 0 to 10, preferably from 0.001 to 5, more preferably from 0.002 to 5, even more preferably from 0.002 to 3, most preferably from 0.005 to 1, % of weight of catalyst (D),
- optionally, from 0 to 10, preferably from 0.1 to 5, more preferably from 0.2 to 2% of weight of pot life extender (E),
- optionally, from 0 to 20, preferably 0 to 15, more preferably 5 to 15% of weight of reactive diluent (F), and
- optionally, from 0 to 10, preferably from 0.2 to 5, more preferably from 0.3 to 3, or even more preferably in the range of 0.5 to 2.5% of weight of anti-sagging agent (G), preferably a polyurea anti-sagging agent (G1), based on the total amount of polyacrylate polyol (A1), polyol (B) if present, crosslinker (C), and, if present catalyst (D), pot life extender (E), reactive diluent (F), and/or anti-sagging agent (G).

The coating composition preferably comprises from 50 to 100 weight % of a total amount of polyacrylate polyol (A1), polyol (B) if present, crosslinker (C), and, if present catalyst (D), pot life extender (E), reactive diluent (F), and/or anti-sagging agent (G), based on the total amount of the coating composition.

The crosslinkable composition can suitably be prepared by a process comprising mixing the polyol component (A) with optional polyol (B), crosslinker (C), optional catalyst (D), optional reactive diluent (F) and/or anti-sagging agent (G), for a one-component composition. Alternatively, crosslinkable composition can be prepared by a process comprising mixing the polyol component (A) with optional polyol (B), optional catalyst (D), optional pot life extender (E), optional reactive diluent (F) and/or anti-sagging agent (G), to form a binder component and mixing said binder component with the crosslinker (C) for a two-component composition.

As is usual, in cases where the crosslinker (C) is an isocyanate-functional crosslinker, with crosslinkable compositions comprising a hydroxy-functional binder and an isocyanate-functional crosslinker, the composition according to the invention has a limited pot life. Therefore, the composition can be suitably provided as a multi-component composition, for example as a two-component composition or as a three-component composition, wherein the polyol component (A), optional polyol (B) and optional reactive diluent (F) on the one hand and the crosslinker (C) on the other hand are parts of at least two different components.

Therefore, the invention also relates to a kit of parts for preparing a crosslinkable composition, comprising i. a binder module comprising:
   at least one polyacrylate polyol (A1) according to the invention, and
   optionally: at least one solvent (A2), at least one additive (A3), at least one polyol (B), at least one catalyst (D), at least one pot life extender (E), at least one reactive diluent (F), and/or at least one anti-sagging agent (G); and
ii. a crosslinker module comprising at least one crosslinker (C).

Alternatively, the kit of parts may comprise three components, comprising i. a binder module comprising:
   at least one polyacrylate polyol (A1) according to the invention, and
   optionally: at least one solvent (A2), at least one additive (A3), and/or at least one polyol (B); and
ii. a crosslinker module comprising at least one crosslinker (C), and
iii. a diluent module comprising a volatile organic diluent, wherein, optionally, the at least one catalyst (D), at least one pot life extender (E), at least one reactive diluent (F), and/or at least one anti-sagging agent (G) can be distributed over modules i), ii) or iii), and wherein at least one of the modules optionally comprises the catalyst (D).

In cases where the crosslinker (C) does not readily react at storage temperature with polyacrylate polyol (A1) and/or polyol (B) and/or reactive diluent (F), for example when crosslinker (C) comprises melamine-formaldehyde resins and/or blocked isocyanate groups, all components (A) to (G) could be supplied in one part.

The other components of the crosslinkable composition may be distributed in different ways over the modules as described above, as long as the modules exhibit the required storage stability. Components of the crosslinkable composition which react with each other upon storage, are preferably not combined in one module. If desired, the components of the coating composition may be distributed over even more modules, for example 4 or 5 modules.

The crosslinkable composition of the Invention provides coatings with improved levelling and appearance, present an excellent sag resistance and provides well-balanced other relevant coatings properties such as hardness, chemical resistance, flexibility and durability. The composition is highly suitable to be formulated at a very low content of volatile organic compounds and without highly toxic material.

The crosslinkable composition of the Invention can be applied to any substrate. The substrate may be, for example, metal, e.g., iron, steel, tinplate and aluminium, plastic, wood, glass, synthetic material, paper, leather, concrete or another coating layer. The other coating layer can be comprised of the coating composition of the current invention or it can be a different coating composition. The coating compositions of the current invention show particular utility as clear coats, base coats, pigmented top coats, primers, and fillers.

The crosslinkable composition according to the invention is very suitable for use as a clear coat. A clear coat is essentially free of pigments and is transparent for visible light. However, the clear coat composition may comprise matting agents, for example silica based matting agents, to control the gloss level of the coating.

When the crosslinkable composition of the invention is a clear coat, it is preferably applied over a colour- and/or effect-imparting base coat. In that case, the clear coat forms the top layer of a multi-layer lacquer coating such as typically applied on the exterior of automobiles. The base coat may be a water borne base coat or a solvent borne base coat. The crosslinkable composition of the current invention is also suitable as pigmented topcoat for coating objects such as bridges, pipelines. Industrial plants or buildings, oil and gas installations, or ships. The compositions are particularly suitable for finishing and refinishing automobiles and large transportation vehicles, such as trains, trucks, buses, and airplanes. In general, the crosslinkable composition of the current invention can be applied by spraying, brushing, draw-down, overspray-free applications based on jet-stream or drop-on-demand technology, or any other method to transfer a composition to a substrate.

Therefore, the invention also relates to a method of providing a coating, preferably a coating to at least a part of a substrate (e.g. to at least a part of the exterior surface of a transportation vehicle), wherein the method comprises the steps of applying a coating composition of the invention to at least a part of a substrate (e.g. to at least a part of the exterior surface of a transportation vehicle), and curing the applied coating composition, preferably at a temperature in the range of 5 to 180° C. Those skilled in the art will know that the curing temperature depends on the type of crosslinker (C) used, and that curing can for example be carried out between 5 and 70° C., more preferably between 10 and 65° C., or even more preferably between 15 and 45° C., for certain applications as known by the skilled person, or alternatively between 80 and 180° C., more preferably between 100 and 160° C., or even more preferably around 140° C. (depending on the crosslinker (C) used) for other applications as known by the skilled person. It is apparent for those skilled in the art to select an appropriate curing temperature depending on the crosslinker (C) used and the desired paint application.

An important trend in the art in the market particularly for OEM clear coats is the desire to bake these clear coats with a method requiring less thermal energy. Typical baking temperatures for methods known in the art requiring less thermal energy are normally between 70 and 110° C., preferably between 80 and 100° C. whereas for traditional baking methods used in the art for OEM clear coats, baking temperatures are most preferably around 140° C. It is generally known that OEM clear coats baked with such a method known in the art requiring less thermal energy result in coatings having deteriorated chemical resistance and lower hardness, especially when the solid content of the formulation is high. However, applicants have now found that the present invention is particularly suitable for (use in) a method requiring less thermal energy. Therefore, the present invention provides a method of:

1) applying the crosslinkable composition of the invention to a substrate (e.g. the exterior surface of a transportation vehicle), said crosslinkable composition comprising:
   - a polyacrylate polyol (A1),
   - optionally at least one polyol (B) being different from polyacrylate polyol (A1) and comprising at least two free hydroxyl groups,
   - at least one polyisocyanate crosslinker (C) preferably comprising free isocyanate groups, and
   - optionally at least one catalyst (D) for catalyzing the reaction between hydroxyl groups of polyacrylate polyol (A1), if present polyol (B), if present reactive diluent (F), and isocyanate groups of crosslinker (C), the catalyst (D) being present in an amount of between 0 and 10 wt %, preferably between 0 and 3 wt %, of the total amount of polyacrylate polyol (A1), if present polyol (B), crosslinker (C), if present catalyst (D), and, if present, pot life extender (E), reactive diluent (F) and/or anti-sagging agent (G);
   - optionally one or more pot life extender (E),
   - optionally at least one reactive diluent (F).
   - optionally at least one anti-sagging agent (G), preferably a polyurea anti-sagging agent (G1), the at least one anti-sagging agent (G) preferably being present in the polyacrylate polyol (A1), the polyol (B), and/or the reactive diluent (F).

and 2) curing the applied crosslinkable composition at a temperature of between 70 and 110° C., preferably between 80 and 100° C.

Preferably, the step of curing step the applied crosslinkable composition is performed during a time interval ranging from 15 minutes to 1 hour, preferably from 20 minutes to 40 minutes, more preferably during about 30 minutes.

Another important trend in the art in the market particularly for OEM clear coats is the desire to reduce the number of coating layers and to reduce the number of bake curing steps. Indeed, methods and processes with reduced number of bake curing steps are more economic with regard to amount of paint and energy consumption, compared to standard ways of application known in the art in which usually a primer layer is applied on an electrodeposition coating, followed by a first bake curing step, and subsequent steps of applying an aqueous basecoat layer, performing a flash-off, applying a clear coat layer, and performing a second bake curing. Bake curing in these standard methods known in the art (said standard methods comprising at least two bake curing steps) is often performed at a temperature of at least 80° C., preferably at least 120° C. most preferably around 140° C. The bake curing step is often performed during a time interval ranging from 15 minutes to 1 hour. In contrast to the standard process known in the art, a process with reduced number of bake curing steps is often characterized in elimination of both the step of applying the primer layer as well as of performing the first bake curing step.

The coating composition according to the present invention was now surprisingly found to be particularly suitable for use in crosslinkable clear coat compositions used in methods and processes where the number of bake curing steps is reduced compared to such a standard process as described above. The present invention therefore also provides a method of providing a coating to at least a part of a substrate, preferably to at least a part of the exterior surface of a transportation vehicle, wherein the method comprises the steps of applying a first aqueous colored layer on a metal substrate (metal layer) or on an electrodeposition layer (said electrodeposition layer being applied on the metal substrate), followed by subsequent steps of performing a flash-off, applying an aqueous basecoat layer, performing another flash-off, and thereafter applying a clear coat layer comprising the coating composition according to the present invention, followed by performing (only) one bake curing step for all layers simultaneously (for all layers together). The flash-off time is short, more particularly flash-off is performed during less than 1 hour, preferably less than 30 minutes, more preferably flash-off is performed between 5 and 20 minutes, most preferably between 5 and 10 minutes, and flash-off is performed at low temperature, preferably at a temperature lower than 90° C., more preferably at 80° C. The one bake curing is performed at a temperature ranging from 125° C. to 180° C., preferably from 125° C. to 160° C., more preferably from 130° C. to 150° C., even more preferably from 130° C. to 145° C., most preferably from 135° C. to 145° C. The bake curing step is performed during a time interval ranging from 15 minutes to 1 hour, preferably from 20 minutes to 40 minutes, more preferably during about 30 minutes.

With the present invention, it was surprisingly found that the polyacrylate polyol (A1) according to the invention is particularly suitable to formulate crosslinkable compositions, preferably clear coat compositions, when polyacrylate polyol (A1) is combined with polyol (B), crosslinker (C) and optionally catalyst (D), pot life extender (E), reactive diluent (F) and/or anti-sagging agent (G). When using such crosslinkable compositions in the above described process with reduced number of bake curing steps, the obtained coating layer gives good appearance, excellent sag resistance and very good chemical resistance. Furthermore, it was particularly surprising to find that when polyacrylate polyol (A1) is combined with polyol (B), crosslinker (C) preferably of the type of melamine-formaldehyde resins, a catalyst (D) preferably of the type of blocked sulfonic acids, reactive diluent (F) and polyurea anti-sagging agent (G1), coating layers are obtained with good appearance, excellent sag resistance, very good chemical resistance, and low VOC.

The present invention further relates to the coatings and coated substrates obtained by using the compositions according to the invention or by the methods according to the invention as described here above. Such coatings combine very good appearance with other properties such as hardness, chemical resistance, flexibility and durability, and makes them particularly suitable for automotive applications.

EXAMPLES

In the examples, the glass transition temperature Tg was determined using a Mettler DSC 3+ calorimeter according to DIN EN ISO 16805 and ISO 11357. More particularly, a 7-15 mg sample was first heated well above the Tg at 120° C. This temperature was kept for 5 minutes after which the temperature was brought down to −20° C. with a cooling rate of 30° C./min. The sample was then cooled at −20° C. for 5 min and subsequently, the sample was heated to 120° C. with a temperature increase of 10° C./minute. The Tg is the temperature at the Intersection of the tangent of the baseline and the tangent at the maximum negative slope in a plot of the heat flow versus temperature.

The molecular weight and molecular weight distribution was determined according to ASTM D 3593 by Gel Permeation Chromatography using polystyrene standards, more particularly using size exclusion chromatography. The size-exclusion apparatus used was an Alliance system consisting of a pump, autosampler and He-degasser (Degasys DG-1210 from Uniflows), equipped with a PLgel 5 μm MIXED-C 600×7.5 mm Column and a Plgel 5 μm guard column (50×7.5 mm—Polymer Laboratories). The Column oven (Separations Analytical Instruments) was set at 30° C. Tetrahydrofuran (THF—Extra Dry, Biosolve 206347)+2% acetic acid (Baker 6052) was used as eluent at a flow-rate of 0.8 ml/min. Carbon disulfide (Backer) was used as a marker. A Waters 410 refractive index was used as detector. The injection Volume was 100 μl at a concentration of 1.5 mg/ml. Polystyrene standards (Polymer Laboratories, Easical PS-1, 2010-0501 (M range 580 g/mol-8.500.000 g/mol) and Easical PS-2, 2010-0601 (M range 580 g/mol-400.000 g/mol)) were used for calibration using a third order polynomial. Software used for data-analysis was Empower (Waters). In a plot of the eluded weight fraction versus the molecular weight thus obtained, the Mn is molecular weight at which 50% of the molecules have eluded and the Mw is the molecular weight at which 50% of the total mass has eluded.

Example 1: A (meth)acrylic polyol according to the invention having a hydroxyl value of 145 mg KOH/g (on non-volatile content), an acid value of 6.0 mg KOH/g (on non-volatile content), a Mw 1,735 Dalton and a Mn 943 Dalton (GPC, polystyrene standard) and a Tg of 15° C., was prepared from the polymerization of a mixture of 0.3 parts of acrylic acid, 35.1 parts of hydroxy ethyl methacrylate, 7.5 parts of butyl acrylate, 22.5 parts of butyl methacrylate, 21.1 parts of norbornyl acrylate, 1.1 parts of methyl methacrylate and 12.3 parts of styrene. After polymerization was completed, 42.5 parts of a polyester resin with Mw 2,189 Dalton and Mn 1,146 Dalton (GPC, polystyrene standard) and a Tg of −11° C., a hydroxy value of 172 mg KOH/g and an acid value of 8 mg KOH/g was added. The (meth)acrylic polyol-polyester polyol mixture was dissolved in butyl acetate yielding a solution with a non-volatile content of 78% by weight. Upon dilution to a non-volatile content of 70% by weight using butyl acetate, the viscosity according to ASTM D 4287 was 310 mPa·s at 100 $s^{-1}$.

Comparative Example 2: A (meth)acrylic polyol having a hydroxyl value of 132 mg KOH/g (on non-volatile content), an acid value of 2.4 mg KOH/g (on non-volatile content), a Mw 2,867 and a Mn 1,303 (GPC, polystyrene standard) and a Tg of −4° C., was prepared from the polymerization of a mixture of 0.3 parts of acrylic acid, 30.2 parts of hydroxy ethyl methacrylate, 7.5 parts of butyl acrylate, 24.8 parts of butyl methacrylate and 36.1 parts of styrene. The (meth) acrylic polyol was dissolved in butyl acetate yielding a solution with a non-volatile content of 78% by weight.

Example 3: In a 5 litre glass vessel, equipped with a temperature jacket and a stirrer the resin from Example 1 was charged and heated to 30° C. Benzyl amine was then added to the reaction vessel and the mixture was homogenized for 10 to 15 minutes and subsequently cooled with ice-water. The stirrer speed was increased to 750 rpm and hexamethylene diisocyanate diluted with butyl acetate was added. The reaction mixture was stirred for 30 minutes and further diluted with butyl acetate to a solids content of 73.5%. The resulting resin contained 7.5 wt % of polyurea anti-sagging agent and 66.0 wt % of polyacrylate polyol. The particle size of the polyurea anti-sagging agent determined using the ISO 1524 method was found to be less than 15 μm.

Comparative Example 4: Example 3 was repeated except that the resin from Example 1 was replaced by the resin from Comparative Example 2. The resulting resin had a solids content of 67.1% and contained 7.1 wt % polyurea anti-sagging agent and 60.0 wt % of polyacrylate polyol. The particle size of the polyurea anti-sagging agent determined using the ISO 1524 method was found to be less than 15 μm.

TABLE 1

| | Ex 5 | Comp Ex 6 |
|---|---|---|
| Resin from Example 1 | 142.31 | |
| Resin from Comparative Example 2 | | 135.90 |
| SETAL ® 1406 | 110.00 | 110.00 |
| Resin from Example 3 | 154.41 | |
| Resin from Comparative Example 4 | | 176.57 |
| CYMEL ® 327 | 170.56 | 170.56 |
| CYMEL ® NF 2000A | 41.00 | 41.00 |
| Butyl acetate | 23.00 | 27.00 |
| CYCAT ® 600 | 3.00 | 3.00 |
| Ammonia (25%) | 2.03 | 2.03 |
| BYK ® 315N | 2.05 | 2.05 |
| BYK ® 310 | 0.51 | 0.51 |
| n-Butanol | 27.64 | 27.64 |
| Xylene | 40.03 | 25.33 |

SETAL® 1406 is a slightly branched polyester polyol.

CYMEL® 327 resin is a methylated high imino melamine crosslinker supplied in iso-butanol.

CYMEL® NF 2000A resin is a unique trifunctional melamine-based crosslinker containing reactive carbamate functionality supplied in n-butanol.

CYCAT® 600 is a strong acid catalyst based on dodecylbenzene sulfonic acid supplied in isopropanol.

BYK® 315N is a solution of polyester modified polymethyl alkyl siloxane in 2-phenoxyethanol and 2-methoxy-1-methylethyl acetate.

BYK® 310 is a silicone-containing surface additive.

Paints were prepared according to the data in Table 1 and subsequently diluted with butyl acetate, and at different amounts added, the solids content was calculated according to Eq. (I) and the viscosity at 1000 $s^{-1}$ was measured. Results are displayed in FIG. 1 showing the viscosity of paints from Example 5 (triangle) and Comparative Example 6 (circle) versus calculated solids content. From these results it is clearly shown that the viscosity of the paint from Example 5 is much lower compared to the viscosity of Comparative Example 6 at the same solids content.

Subsequently, paints were diluted to 105 mPa·s at 1000 $s^{-1}$. The solids content was calculated according to Eq. (I) and was also determined by diluting 1 g of the paint diluted to 105 mPa·s at 1000 $s^{-1}$ with 3 ml of butyl acetate, mixing and heating at 140° C. for 0.5 hour. Subsequently, the weight of the residue was determined and related to the starting weight of the diluted paint.

These formulations were subsequently used in a process with reduced number of bake curing steps: a commercial waterborne base 1 was sprayed, and after a flash-off time of 3 minutes at RT, a black commercial base 2 was applied wet-on-wet. After 7 minutes flash-off at RT, the system was heated to 80° C. for 10 minutes. Subsequently, a clear coat formulation was applied, followed by 5 minutes flash-off at RT and the complete system was subsequently cured at 140° C. for 24 minutes. Appearance properties such as the Wb, Wd, DOI, longwave and shortwave were measured using a Byk Wavescan Dual.

The sagging limit was determined by spraying the crosslinkable composition on a 5 tinplate panel of 47×30 cm. Halfway over the length, the panel contained 13 holes with a diameter of 1 cm, with a distance of 2.5 cm between the holes. The crosslinkable formulation was sprayed on such a panel with an increasing layer thickness from left to right. The length of each of the tears under the holes and the layer thickness above each hole were determined after curing of the paint. The sag resistance was determined as the layer thickness (in µm) where the (interpolated) tear length was 5 mm.

Xylene resistance was determined by placing a cotton wool ball soaked in xylene on the dried coating for 5 minutes. Subsequently, the cotton wool ball was removed, the coating was wiped with a clean cloth. Lifting of the coating was determined visually and softening by scratching the exposed part with a spatula. Both lifting and softening were judged on a scale of 1 (good) to 5 (bad).

Results are displayed in Table 2.

TABLE 2

| | Ex 5 | Comp Ex 6 |
|---|---|---|
| Solids content (calculated acc. to Eq. (I), 105 mPa · s at 1000 $s^{-1}$) (%) | 63.0 | 60.6 |
| Solids content (measured) (%) | 59.6 | 56.5 |
| Sag resistance (5 mm tear length) (µm) | 33 | 33 |
| Wb (vertical drying) | 30.7 | 33.4 |
| Wd (vertical drying) | 20.6 | 22.9 |
| Longwave (vertical drying) | 10 | 15 |
| Shortwave (vertical drying) | 24 | 29 |
| DOI (vertical drying) | 92 | 90 |
| Xylene resistance-softening | 2 | 2 |
| Xylene resistance-lifting | 3 | 4 |

Data in Table 2 show that the paint of Example 5, most importantly, has a higher solids content at the same viscosity compared to Comparative Example 6. Particularly the measured solids content of the paint of Comparative Example 6 was too low to achieve a VOC compliant paint (i.e. VOC compliant referring to having a VOC content of lower than 420 g/L), whereas the paint of Example 5 is VOC compliant. Furthermore, the coating obtained from Example 5 has a better appearance as observed from the lower values measured for Wb, Wd, longwave, shortwave and higher value for DOI. In addition, similar to better xylene resistance was determined for the coating obtained with the paint from Example 5. In conclusion, the paint from Example 5 displays improved properties and at a higher solid content over the paint from Comparative Example 6.

Example 7: A (meth)acrylic polyol according to the invention having a hydroxyl value of 135 mg KOH/g (on non-volatile content), an acid value of 0 mg KOH/g (on non-volatile content), a Mw 1,846 and a Mn 1,155 (GPC, polystyrene standard) and a Tg of 17° C., was prepared from the polymerization of a mixture of 0.3 parts of acrylic acid, 35.1 parts of hydroxy ethyl methacrylate, 6.9 parts of butyl acrylate, 23.2 parts of butyl methacrylate, 21.1 parts of norbornyl acrylate, 1.1 parts of methyl methacrylate and 12.3 parts of styrene. The (meth)acrylic polyol was dissolved in butyl acetate yielding a solution with a non-volatile content of 78% by weight. Upon dilution to a non-volatile content of 70% by weight using butyl acetate, the viscosity according to ASTM D 4287 was 290 mPa·s at 100 $s^{-1}$.

Example 8: A (meth)acrylic polyol according to the invention having a hydroxyl value of 133 mg KOH/g (on non-volatile content), an acid value of 2.0 mg KOH/g (on non-volatile content), a Mw 2,797 and a Mn 1,592 (GPC, polystyrene standard) and a Tg of 12° C., was prepared from the polymerization of a mixture of 31.0 parts of hydroxy ethyl methacrylate, 17.7 parts of butyl acrylate, 10.8 parts of isobutyl methacrylate, 20.0 parts of isobornyl acrylate and 20.5 parts of styrene. The (meth)acrylic polyol was dissolved in butyl acetate yielding a solution with a non-volatile content of 74% by weight.

Example 9: A (meth)acrylic polyol according to the invention having a hydroxyl value of 133 mg KOH/g (on non-volatile content), an acid value of 1.9 mg KOH/g (on non-volatile content), a Mw 2,751 and a Mn 1,574 (GPC, polystyrene standard) and a Tg of 13° C., was prepared from the polymerization of a mixture of 31.0 parts of hydroxy ethyl methacrylate, 17.7 parts of butyl acrylate, 10.8 parts of isobutyl methacrylate, 20.0 parts of 1,3,3-trimethylbicyclo [2.2.1]heptyl acrylate and 20.5 parts of styrene. The (meth) acrylic polyol was dissolved in butyl acetate yielding a solution with a non-volatile content of 74% by weight.

Example 10: A (meth)acrylic polyol according to the invention having a hydroxyl value of 132 mg KOH/g (on non-volatile content), an acid value of 2.2 mg KOH/g (on non-volatile content), a Mw 2,681 and a Mn 1,496 (GPC, polystyrene standard) and a Tg of 14° C., was prepared from the polymerization of a mixture of 30.6 parts of hydroxy ethyl methacrylate, 17.5 parts of butyl acrylate, 10.7 parts of isobutyl methacrylate, 20.9 parts of (octahydro-4,7-methano-1H-indenyl)methyl acrylate and 20.3 parts of styrene. The (meth)acrylic polyol was dissolved in butyl acetate yielding a solution with a non-volatile content of 74% by weight.

Example 11: A (meth)acrylic polyol according to the invention having a hydroxyl value of 128 mg KOH/g (on non-volatile content), an acid value of 2.0 mg KOH/g (on non-volatile content), a Mw 2,723 and a Mn 1,574 (GPC, polystyrene standard) and a Tg of 13° C., was prepared from the polymerization of a mixture of 29.8 parts of hydroxy ethyl methacrylate, 17.0 parts of butyl acrylate, 10.4 parts of isobutyl methacrylate, 23.1 parts of monoester of octahydro-4,7-methano-1H-indenedimethanol and acrylic acid and 19.7 parts of styrene. The (meth)acrylic polyol was dissolved in butyl acetate yielding a solution with a non-volatile content of 74% by weight.

Comparative Example 12: A (meth)acrylic polyol having a hydroxyl value of 153 mg KOH/g (on non-volatile content), an acid value of 2.2 mg KOH/g (on non-volatile content), a Mw 2,123 and a Mn 1,285 (GPC, polystyrene standard) and a Tg of 1° C., was prepared from the polymerization of a mixture of 0.3 parts of acrylic acid, 35.1 parts of hydroxy ethyl methacrylate, 1.2 parts of methyl methacrylate, 7.5 parts of butyl acrylate, 22.5 parts of butyl methacrylate and 33.5 parts of styrene. The (meth)acrylic polyol was dissolved in butyl acetate yielding a solution with a non-volatile content of 78% by weight. Upon dilution to a non-volatile content of 70% by weight using butyl acetate, the viscosity according to ASTM D 4287 was 420 mPa·s at 100 $s^{-1}$.

Comparative Example 13: Resin A from US20190106527 was prepared, having Mn 1,650. Mw 3,100, Tg of 31° C. Upon dilution to a non-volatile content of 70% by weight using butyl acetate, the viscosity according to ASTM D 4287 was 2200 mPa·s at 100 $s^{-1}$.

TABLE 3

| | Ex 14 | Ex 15 | Ex 16 | Ex 17 | Ex 18 | Comp Ex 19 | Comp Ex 20 | Comp Ex 21 |
|---|---|---|---|---|---|---|---|---|
| Resin from Example 7 | 41.2 | | | | | | | |
| Resin from Example 8 | | 41.2 | | | | | | |
| Resin from Example 9 | | | 41.2 | | | | | |
| Resin from Example 10 | | | | 41.2 | | | | |
| Resin from Example 11 | | | | | 41.2 | | | |
| Resin from Comparative Example 2 | | | | | | 41.2 | | |
| Resin from Comparative Example 12 | | | | | | | 41.2 | |
| Resin from Comparative Example 13 | | | | | | | | 42.8 |
| SETALUX ® 91796 SS-69 | 14.4 | 14.4 | 14.4 | 14.4 | 14.4 | 14.4 | 14.4 | 14.4 |
| SETAMINE ® US-138 BB-70 | 25.7 | 25.7 | 25.7 | 25.7 | 25.7 | 25.7 | 25.7 | 25.7 |
| NACURE ® 5414 | 0.55 | 0.55 | 0.55 | 0.55 | 0.55 | 0.55 | 0.55 | 0.55 |
| n-butanol | 2 | 2 | 2 | 2 | 2 | 2 | 2 | 2 |
| BYK ® 315N | 0.2 | 0.2 | 0.2 | 0.2 | 0.2 | 0.2 | 0.2 | 0.2 |
| BYK 310 | 0.05 | 0.05 | 0.05 | 0.05 | 0.05 | 0.05 | 0.05 | 0.05 |
| TINUVIN ® 384-2 | 0.55 | 0.55 | 0.55 | 0.55 | 0.55 | 0.55 | 0 55 | 0.55 |
| TINUVIN 123 | 0.55 | 0.55 | 0.55 | 0.55 | 0.55 | 0.55 | 0.55 | 0.55 |
| Methyl amyl ketone | 8 | 8 | 8 | 8 | 8 | 8 | 8 | 1.7 |
| Solvesso 100 | 5 | 5 | 5 | 5 | 5 | 5 | 5 | 5 |
| Ethoxy ethylpropionate | 5 | 5 | 5 | 5 | 5 | 5 | 5 | 5 |

With in Table 3:

SETALUX®91796 SS-69 is a thermosetting hydroxylated acrylic resin, modified with an anti-sagging agent SETAMINE® US-138 BB-70 is a solution of a non-plasticized melamine resin with very high reactivity NACURE 5414 is a polymeric blocked sulfonic acid ester catalyst TINUVIN 384-2 is a liquid UV absorber of the hydroxyphenylbenzotriazole class TINUVIN 123 is a liquid HALS stabilizer based on an aminoether functionality.

Solvesso 100 and Solvesso 150 are mixtures of aromatic solvents.

Paints were prepared according to Table 3, the solid content was calculated and the DinCup 4 viscosity was determined. Results are displayed in Table 4.

TABLE 4

| | Ex 14 | Ex 15 | Ex 16 | Ex 17 | Ex 18 |
|---|---|---|---|---|---|
| Solid content (%) (calculated acc. to Eq. (I)) | 59.7 | 59.7 | 59.7 | 59.6 | 59.7 |
| DinCup 4 viscosity (s) | 27 | 29 | 29 | 28 | 29 |

| | Comp Ex 19 | Comp Ex 20 | Comp Ex 21 |
|---|---|---|---|
| Solid content (%) (calculated acc. to Eq. (I)) | 59.7 | 59.3 | 59.7 |
| DinCup 4 viscosity (s) | 37 | 32 | 42 |

The data from Table 4 clearly show that at this high solid content, the paints obtained from Examples 14-18 are at spray viscosity and need no further dilution. The paints obtained from Comparative Examples 19-21, however, are too viscous, and would need further dilution to bring them to spray viscosity. However, the VOC would become too high (i.e. higher than 420 g/L) if that was done, and therefore these paints were not studied further.

The paints of Examples 14-18 were spray applied on a tinplate precoated with a black solvent borne basecoat and subsequently cured for 30 min at 140° C. It was found that the hardness and appearance were very good and the gloss was excellent.

Comparative Example 22: A (meth)acrylic polyol having a hydroxyl value of 150 mg KOH/g (on non-volatile content), an acid value of 9 mg KOH/g (on non-volatile content), a Mw 3,790 and a Mn 1,800 (GPC, polystyrene standard) and a Tg of 10° C. was prepared from the polymerization of a mixture of 0.7 parts of acrylic acid, 28.1 parts of hydroxy ethyl methacrylate, 8.0 parts of hydroxy ethyl acrylate, 4.6 parts of butyl acrylate, 30.6 parts of isobutyl methacrylate and 30 parts of styrene. The (meth) acrylic polyol was dissolved in butyl acetate yielding a solution with a non-volatile content of 75% by weight.

Comparative Example 23: A (meth)acrylic polyol having a hydroxyl value of 65 mg KOH/g (on non-volatile content), an acid value of 5.8 mg KOH/g (on non-volatile content), a Mw 8.759 and a Mn 2,241 (GPC, polystyrene standard) and a Tg of 13° C., was prepared from the polymerization of a mixture of 0.75 parts of acrylic acid, 15 parts of hydroxyethyl methacrylate, 30 parts of butyl acrylate, 14.25 parts of butyl methacrylate and 40 parts of styrene. The (meth) acrylic polyol was dissolved in a mixture of butyl acetate and xylene yielding a solution with a non-volatile content of 80% by weight.

TABLE 5

| | Ex 24 | Ex 25 | Comp Ex 26 | Comp Ex 27 |
|---|---|---|---|---|
| Acrylic resin from Example 1 | 26.1 | 24.7 | | |
| SETAL ® 1406 | 2.3 | 2.2 | | |
| Resin from Comparative Example 22 | | | 33 | |
| Resin from Comparative Example 23 | | | | 38 |
| TI-PURE ™ R-706 | 44.5 | 44.5 | 44.5 | 44.5 |
| ADDITOL ® 6577 | 1.3 | 1.3 | 1.3 | 1.3 |
| Xylene | | | 3 | 3 |
| Solvent mix | 5.1 | 5.1 | | |
| Methoxy propyl acetate | 0.2 | 0.2 | 2 | 2 |
| ADDITOL ® VXL 4930 | | | 0.2 | 0.2 |
| MODAFLOW ® 9200 | 0.2 | 0.2 | 0.2 | 0.2 |
| DBTDL-1% solution in butyl acetate | 0.9 | 0.9 | 0.9 | 0.9 |
| TINUVIN ® 292 | 0.3 | 0.3 | 0.3 | 0.3 |
| TINUVIN ® 1130 | 0.3 | 0.3 | 0.3 | 0.3 |
| TOLONATE ™ HDT-90 | 15.8 | 16.7 | 14.0 | 7.7 |

Solvent mix is a mixture of 58.8 parts of xylene, 39.2 parts of methoxy propyl acetate and 2 parts of 2-ethyl-1,3-hexanediol.

Ti-PURE™ R-706 is a rutile titanium dioxide pigment.

ADDITOL® 6577 is a wetting and dispersing agent for solvent containing systems.

ADDITOL® VXL 4930 is a modified silicone for Improvement of levelling and surface smoothness of solvent containing and aqueous paints.

DBTDL is dibutyl tin dilaurate.

TINUVIN® 292 is a liquid hindered amine light stabilizer especially developed for coatings.

TINUVIN® 1130 is a liquid UV absorber of the hydroxyphenyl benzotriazole class.

TOLONATE™ HDT-90 is an aliphatic polyisocyanate, based on HDI-trimer (isocyanurate), supplied at 90% solids in a blend of butyl-acetate/high flash aromatic solvent (1 for 1 by weight).

Paints were prepared according to Table 5, paints were diluted to 20 s DinCup 4 using butyl acetate and the solid content was calculated. Results are displayed in Table 6.

TABLE 6

| | Ex 24 | Ex 25 | Comp Ex 26 | Comp Ex 27 |
|---|---|---|---|---|
| Solids Content (%) calculated acc. to Eq. (I) | 63.9 | 64.8 | 53.6 | 53.7 |
| Xylene resistance | ++ | ++ | ++ | − |
| Gloss (20°) | 87.6 | 87.5 | 84.1 | 92.3 |

The data in Table 6 clearly display that the solids content of the paints obtained from Examples 24-25 is much higher compared to the solids content of the paints obtained from Comparative Examples 26-27. Furthermore, it was observed that the xylene resistance of the coatings from Examples 24-25 was much better compared to the xylene resistance of the coating from Comparative Example 27. Furthermore, it was particularly surprising that the gloss of Examples 24-25 was significantly higher compared to the gloss obtained in Comparative Example 26. In summary, the paints from Examples 24-25 according to the invention are much better balanced and, importantly, fulfil more stringent VOC regulations.

Paints were prepared according to Table 7. Paints were spray applied and subsequently exposed to UV-B light according to ASTM G 53. Gloss was determined at regularly time intervals. Data in Table 8 demonstrate that Example 28 according to invention displays much better resistance to UV-B light compared to Comparative Example 29 not according to the invention.

TABLE 7

| | Example 28 | Comparative Example 29 |
|---|---|---|
| Resin from Example 1 | 37.41 | |
| Resin from Comp Ex 2 | | 39.8 |
| SETALUX ® 91796 SS-69 | 20.81 | 13.97 |
| CYMEL ® 1168 | 14.78 | |
| SETAMINE ® US-138 BB-70 | 5.17 | 24.86 |
| CYCAT ® 6020 | 1.47 | |
| NACURE ® 5414 | | 0.59 |
| n-butanol | 4.16 | 2.97 |
| BYK ®-310 | 0.05 | 0.05 |
| BYK-315 | 0.23 | 0.22 |
| TINUVIN ® 384-2 | 0.73 | 0.55 |
| TINUVIN 123 | 0.73 | 0.55 |
| Methyl amyl ketone | 6.35 | |
| Solvesso 150 | 3.12 | 8.24 |
| Xylene | 1.86 | 5.49 |
| Butyl glycol acetate | 3.12 | 2.75 |

TABLE 8

| Gloss (20°) development during UV exposure | | |
|---|---|---|
| Time (h) | Example 28 | Comparative Example 29 |
| 0 | 91.8 | 96.5 |
| 332 | 91.4 | 95.2 |
| 487 | 91.8 | 97.3 |
| 861 | 91.5 | 96.7 |
| 1297 | 91.6 | 98.3 |
| 1728 | 92.2 | 48.7 |
| 2301 | 88.1 | 43 |

The invention claimed is:

1. A polyol component (A) comprising at least one polyacrylate polyol (A1) obtained from:

10 to 60 wt % of hydroxyalkyl (meth)acrylate monomers (a1), wherein the hydroxylated alkyl group contains from 1 to 20 carbon atoms;

optionally from 0 to 70 wt % of linear or branched alkyl (meth)acrylate monomers (a2) wherein the alkyl group contains from 1 to 20 carbon atoms;

10 to 60 wt % of vinyl monomers (a3);

5 to 50 wt % of cycloaliphatic (meth)acrylate monomers (a4), optionally the cycloaliphatic group of the cycloaliphatic (meth)acrylate (a4) contains from 5 to 16 carbon atoms; and optionally from 0 to 5 wt % (meth)acrylic acid (a5);

based on the sum of (a1), (a3) and (a4), and, if present, (a2) and (a5);

the polyacrylate polyol (A1) having:

a number averaged molecular weight Mn of between 500 and 2,000 Dalton;

a weight averaged molecular weight Mw of between 1,000 and 2,900 Dalton;

an acid value (AV) of lower than 10 mg KOH per gram of the polyol (A1); and a glass transition temperature Tg of lower than 50° C., wherein a viscosity according to ASTM D 4287 of the polyol component (A) is less than 400 mPa·s at 100 $s^{-1}$ when diluted with butyl acetate to 70% solid content of the at least one polyacrylate polyol (A1) comprised in the polyol component (A).

2. The polyol component of claim 1, wherein the polyacrylate polyol (A1) is a random (co) polymer comprising on average at least 2 free hydroxyl groups.

3. The polyol component of claim 1, wherein the hydroxyalkyl(meth)acrylate monomers (a1) used for obtaining the (meth)acrylic polyol (A1) are hydroxyethyl (meth)acrylate, hydroxypropyl (meth)acrylate, hydroxybutyl (meth)acrylate, or mixtures thereof.

4. The polyol component of claim 1, wherein the cycloaliphatic (meth)acrylate monomers (a4) are isobornyl (meth) acrylate, norbornyl (meth)acrylate, 2,6,6-trimethylbicyclo [3.1.1]heptyl (meth)acrylate, 1,3,3-trimethylbicyclo[2.2.1] heptyl (meth)acrylate, (octahydro-4,7-methano-1H-indenyl) methyl (meth)acrylate, esters of isomers of octahydro-4,7-methano-1H-indenedimethanol and (meth)acrylic acid, (substituted) cyclohexyl (meth)acrylate, or mixtures thereof.

5. The polyol component of claim 1, wherein the polyacrylate polyol (A1) has a Mn of lower than 2,000 Dalton, a Mw of lower than 2,500 Dalton, a polydispersity lower than 4, an acid value (AV) of between 0 and 10 mg KOH/g polyol (A1), a glass transition temperature higher than −15° C., and comprises from 5 to 50 wt %, based on the sum of (a1), (a3) and (a4), and, if present, (a2) and (a5), of cycloaliphatic (meth)acrylate monomers (a4).

6. The polyol component of claim 5 wherein the cycloaliphatic (meth)acrylate monomer (a4) is 2,6,6-trimethylbicyclo[3.1.1]heptyl (meth)acrylate, 1,3,3-trimethylbicyclo [2.2.1]heptyl (meth)acrylate, (octahydro-4,7-methano-1H-indenyl) methyl (meth)acrylate, esters of isomers of octahydro-4,7-methano-1H-indenedimethanol and (meth) acrylic acid, norbornyl (meth)acrylate, or mixtures thereof.

7. The polyol component of claim 1, wherein the polyacrylate polyol (A1) has a Mn of lower than 1,600 Dalton, a Mw of lower than 2,900 Dalton, a polydispersity lower than 4, an acid value (AV) of between 0 and 10 mg KOH/g polyol (A1), a glass transition temperature higher than −15° C., and comprises from 5 to 50 wt %, based on the sum of (a1), (a3) and (a4), and, if present, (a2) and (a5), of cycloaliphatic (meth)acrylate monomers (a4).

8. The polyol component of claim 7, wherein the hydroxyalkyl (meth)acrylate monomers (a1) are hydroxyethyl (meth)acrylate, hydroxypropyl (meth)acrylate, or mixtures thereof, and wherein the cycloaliphatic (meth)acrylate monomers (a4) are isobornyl (meth)acrylate, 2,6,6-trimethylbicyclo [3.1.1]heptyl (meth)acrylate, 1,3,3-trimethylbicyclo [2.2.1]heptyl (meth)acrylate, (octahydro-4,7-methano-1H-indenyl) methyl (meth)acrylate, esters of isomers of octahydro-4,7-methano-1H-indenedimethanol and (meth)acrylic acid, (substituted) cyclohexyl (meth) acrylate, or mixtures thereof, optionally the cycloaliphatic (meth)acrylate monomers (a4) is isobornyl (meth)acrylate.

9. The polyol component of claim 1 comprising:

from 35 to 100% by weight of polyacrylate polyol (A1);
from 0 to 50% by weight of solvent (A2);
from 0 to 10% by weight of additives (A3);
from 0 to 40% by weight of at least one polyol (B) being different from polyacrylate polyol (A1) and comprising at least two free hydroxyl groups;
from 0 to 5% by weight of pot life extender (E);
from 0 to 20% by weight of reactive diluent (F); and/or
from 0 to 15% by weight of an anti-sagging agent (G);
relative to the total weight of polyol component (A).

10. The polyol component of claim 9 comprising:

from 35 to 100% by weight of polyacrylate polyol (A1); and
from 10 to 40% by weight of solvent (A2); and/or
from 0 to 10% by weight of additives (A3);
from 0 to 40% by weight of polyol (B), being different from polyacrylate polyol (A1) and comprising at least two free hydroxyl groups;
from 0 to 5% by weight of pot life extender (E);
from 0 to 20% by weight of reactive diluent (F);
from 0 to 15% by weight of an anti-sagging agent (G);

relative to the total weight of polyol component (A).

11. A crosslinkable composition comprising:

a) the polyol component (A) according to claim 1;
b) optionally at least one polyol (B) being different from polyacrylate polyol (A1) and comprising at least two free hydroxyl groups;
c) at least one crosslinker (C);
d) optionally at least one catalyst (D);
e) optionally at least one pot life extender (E);
f) optionally at least one reactive diluent (F) having a number averaged molecular weight ranging from 62 to 4,000 Dalton, a polydispersity Mw/Mn ranging from 1 to 3, and an average hydroxyl functionality ranging from 1 to 6; and
g) optionally at least one anti-sagging agent (G), wherein the crosslinker (C) comprises functional groups reactable with polyacrylate polyol (A1), if present polyol (B), and/or if present reactive diluent (F), wherein the catalyst (D) catalyses a reaction between hydroxyl groups of polyacrylate polyol (A1), if present polyol (B), if present reactive diluent (F), and functional groups of crosslinker (C), and wherein the catalyst (D) is present in an amount of between 0 and 10 wt % of the total amount of polyacrylate polyol (A1), if present polyol (B), crosslinker (C), if present catalyst (D), if present pot life extender (E), if present reactive diluent (F) and if present anti-sagging agent (G).

12. The crosslinkable composition of claim 11, wherein polyacrylate polyol (A1) is present at a level in the range of 10 to 90 percent by weight based on the total amount of polyacrylate polyol (A1), if present polyol (B), crosslinker (C), if present catalyst (D), if present pot life extender (E), if present reactive diluent (F), and if present anti-sagging agent (G).

13. The crosslinkable composition of claim 11, wherein polyol (B) is present and is selected from the group consisting of polyester polyols, polyacrylate polyols, and mixtures or hybrids thereof.

14. The crosslinkable composition of claim 11, wherein the at least one crosslinker (C) is selected from the group consisting of isocyanates, blocked isocyanates, amino resins, and mixtures of amino resins with isocyanates.

15. The crosslinkable composition of claim 11, wherein the reactive diluent (F) is present and is a monofunctional alcohol, diol, or triol, the reactive diluent (F) being a liquid compound comprising between 2 and 40 carbon atoms.

16. The crosslinkable composition of claim 11, wherein the reactive diluent (F) is present and is a diol having a melting point of higher than −60° C. and a boiling point of higher than 200° C., and having between 5 and 12 carbon atoms.

17. The crosslinkable composition of claim 11 comprising:

from 10 to 90% of weight of polyacrylate polyol (A1),
optionally, from 0 to 90% of weight of polyol (B),
from 10 to 90% of weight of polyisocyanate crosslinker (C),
optionally, from 0 to 10% of weight of catalyst (D),
optionally, from 0 to 10% of weight of pot life extender (E),
optionally, from 0 to 20% of weight of reactive diluent (F), and
optionally, from 0 to 10% of weight of anti-sagging agent (G), based on the total amount of polyacrylate polyol (A1), if present polyol (B), crosslinker (C), if present catalyst (D), if present pot life extender (E), if present reactive diluent (F), and if present anti-sagging agent (G).

18. A binder module comprising the crosslinkable composition according to claim 11, and optionally at least one solvent (A2), and at least one additive (A3), wherein the crosslinkable composition comprises polyacrylate polyol (A1), polyol (B), catalyst (D), pot life extender (E), reactive diluent (F), and/or anti-sagging agent (G).

19. A method of providing a coating comprising the steps of applying the crosslinkable composition according to claim 11 to at least a part of a substrate and curing the applied crosslinkable composition at a temperature in the range of 5 to 180° C.

20. The method of claim 19, comprising the steps of:

1) applying the crosslinkable composition to at least a part of a substrate, and 2) curing the applied crosslinkable composition at a temperature of between 7° and 110° C.

21. The method of claim 19, comprising the steps of:

applying a first aqueous colored layer on a metal substrate or on an electrodeposition layer, performing subsequent steps of flash-off, application of an aqueous basecoat layer, another flash-off, and applying a clear coat layer comprising the crosslinkable composition, and performing one bake curing step for all layers simultaneously, wherein flash-off is performed for less than 1 hour, at a temperature lower than 90° C., and the bake curing step is performed at a temperature in the range of 125° C. to 180° C.

22. The method of claim 21, wherein the crosslinkable composition comprises polyacrylate polyol (A1), polyol (B), crosslinker (C), catalyst (D), reactive diluent (F) and polyurea anti-sagging agent (G1).

* * * * *